US005999933A

United States Patent [19]
Mehta

[11] Patent Number: 5,999,933
[45] Date of Patent: Dec. 7, 1999

[54] PROCESS AND APPARATUS FOR COLLECTING A DATA STRUCTURE OF A MEMORY DUMP INTO A LOGICAL TABLE

[75] Inventor: Abhay Mehta, Austin, Tex.

[73] Assignee: Compaq Computer Corporation, Cupertino, Calif.

[21] Appl. No.: 08/572,759

[22] Filed: Dec. 14, 1995

[51] Int. Cl.[6] .................................................. G06F 17/30
[52] U.S. Cl. ...................... 707/100; 711/156; 711/171; 711/172; 711/207; 711/209; 711/221
[58] Field of Search ..................... 395/611, 612, 395/416, 181, 182.04, 182.06, 182.13; 707/100; 711/171, 172, 209, 207, 156, 221, 101, 102, 103

[56] References Cited

U.S. PATENT DOCUMENTS

| | | | |
|---|---|---|---|
| 5,111,384 | 5/1992 | Aslanian et al. | 395/575 |
| 5,119,377 | 6/1992 | Cobb et al. | 371/19 |
| 5,293,612 | 3/1994 | Shingai | 395/425 |
| 5,335,341 | 8/1994 | Chana | 395/575 |
| 5,408,660 | 4/1995 | Kitadate | 395/650 |
| 5,410,666 | 4/1995 | Nakano et al. | 395/425 |
| 5,432,942 | 7/1995 | Trainer | 395/700 |
| 5,434,971 | 7/1995 | Lysakowski, Jr. | 395/200 |
| 5,446,575 | 8/1995 | Lysakowski, Jr. | 395/200.01 |
| 5,555,404 | 9/1996 | Torbjornsen et al. | 395/600 |
| 5,606,684 | 2/1997 | Nakano et al. | 395/441 |
| 5,664,115 | 9/1997 | Elko et al. | 711/170 |

OTHER PUBLICATIONS

Article by Lee et al., entitled "Identifying Software Problems Using Symptoms" published by *IEEE Computer Society Press*, The Twenty–Fourth International Symposium on Fault–Tolerant Computing, Jun. 15–17, 1994, 0363–8928/94, at 320, pp. 1–10.

*Primary Examiner*—Jean Raymond Homere
*Attorney, Agent, or Firm*—Fenwick & West LLP

[57] ABSTRACT

A hardware/software system for analyzing memory dumps. The system collects data structures in a memory dump into logical tables, one logical table per selected type of data structure. The logical tables are generated by use of extraction logic for extracting data in data structures in the memory dump. The extraction logic is used in conjunction with a template library that contains data structure definitions for various types of data structures. The extraction logic, together with the template library, make possible populating logical tables with the contents of data structures found in the memory dump. Each row in a logical table is dedicated to one data structure of the selected type. Collecting data structures into logical tables makes available the power of a standard database management system for operating on the logical tables to determine the cause of a crash of a hardware/software system for which the memory dump was taken.

28 Claims, 23 Drawing Sheets

| PCB | PIN | PRIORITY OF PROCESS | RUN TIME | NUMBER OF FILES OPEN |
|---|---|---|---|---|
| 1 | | | | |
| 2 | | | | |
| 3 | | | | |
| 4 | | | | |
| 5 | | | | |
| ... | ... | ... | ... | ... |

FIG. 2

EXTRACTION TABLE 151

| NAME 514 | OBJECT NAME 610 | SIZE 522 | STEP NUMBER 614 | SUB STEP NUMBER 616 | FETCH LOGIC 618 | PARAMETERS 622 626 | | |
|---|---|---|---|---|---|---|---|---|
| ZPCB | TEMPLATE LIBRARY NAME | 16256 | 1 | — | 0 | | | |
| ZPCB | " | " | 2 | 1 | 5 | | | |
| ZPCB | " | " | 2 | 2 | 10 | | | |
| XSEG | | | 1 | | 4 | | | |
| XSEG | | | 2 | | | | | |
| XSEG | | | 3 | | | | | |
| ... | ... | ... | ... | ... | ... | ... | ... | ... |

FIG. 6

PROCESS AND APPARATUS FOR COLLECTING A DATA STRUCTURE OF A MEMORY DUMP INTO A LOGICAL TABLE

BACKGROUND OF THE INVENTION

A common problem with hardware/software systems is that they sometimes fail. A hardware/software system is a system that has hardware, which is controlled by software. A computer is an example of such a system. Sometimes, a system failure or crash can occur, for example, due to a logic error in an operating system code. A logic error can occur when there is an error in the sequence of instructions in a software. Sometimes a system failure will be operator induced, because the operator notices that the system does not perform properly. When a system fails (or when failure is induced) an operator of the system typically takes a memory dump. The memory dump is a representation, such as a print out, of the contents of the system's memory, which shows the status of the system at the time of its failure.

A system may have one or several processes being executed by a processor (or possibly more than one processor) at the time of its crash.

The memory dump will be taken for the processor (or processors) responsible for the part of the system that crashed. This memory dump is called a processor dump. A processor dump contains data representative of the entire memory of a processor at the time of the crash. Since a processor can be executing numerous processes, a processor dump contains all of the process dumps for the processes run by that processor.

Each process (and its dump) has an associated data structure called a process control block (PCB). PCB's are one example of a data structure. Another example of a data structure is a data structure representative of a SEG, which is a segment of memory in an operating system. A further example of a data structure is a data structure representative of an SPT, which is a segment page table in the operating system. Each instance of a data structure, such as a PCB, is typically stored in different locations in memory. Data structures instances may be implemented as, for example, trees, lists, or hash tables for optimization of the speed of memory access and physical memory allocation. For example, PCB's can be chained together in linked lists with pointers.

The memory dump taken by an operator typically is given to an analyst. The analyst analyzes the memory dump to determine the cause of the system crash. In analyzing crashes, an analyst looks for abnormalities in data structures. An example of an abnormality is that values of data in data structures in a memory dump are not what the analyst expected them to be. Skilled analysts have expectations of what a fault-free memory dump should look like. They expect certain values, based on their knowledge of the complicated relationships between the data structures. Such knowledge is acquired gradually over the course of several years. Of course, when the relationships between data structures is changed with, for instance, a new release of a system, then the analyst has to learn new relationships, which again can take years.

The analyst often uses debugger software to analyze crashes. Use of debugger software generally requires knowledge of procedures and relationships between data structures. For example, a skilled analyst, may remember that a particular command will display addresses of an initial PCB and of the PCB that encountered a logic error. The relationship between the addresses of these PCB's may supply a process identification number (PIN) of a process that caused the crash. The analyst hopefully remembers or has to look up in a debugger software manual (if one exists with the relevant information) how to process the PIN to determine which process is associated with this PIN. The analyst may have to execute additional debugger software commands to examine the state of this process at the time of the crash. A procedure as outlined above typically changes from release to release of the debugger software. Consequently, to be able to debug software for each new release, an analyst has to memorize new relationships between data structures and new procedures for accessing data structures.

Another example that illustrates the difficulty of analyzing memory dumps is the following. Sometimes an analyst needs to determine, for example, all the PCB's with a certain priority. Then the analyst has to go through each PCB using pointers within one PCB to point to the next PCB and to check the priority in each PCB. To check the priority, the analyst has to know which field within the PCB contains the priority. Moreover, the analyst may not know how many total PCB's exist until the analyst checks every PCB. This lack of knowledge occurs because data structures are allocated dynamically to conserve memory space. Typically, there is insufficient memory to store each possible data structure that might be generated by particular software. Dynamic allocation can be accomplished by use of a linked list. A linked list of, for example, PCB's is convenient because at the time that the software begins to execute, the software has not yet determined how many PCB's will be necessary. Every time a PCB is added, a pointer is created in the prior PCB that points to the new PCB. As a system grows in size and complexity, the size of its memory dumps grows as well. This makes the analysis of memory dumps increasingly difficult. For complex systems, usually no comprehensive manuals exist to guide an analyst, because the pace of change of these systems tends to outpace abilities of system manufacturers to provide such manuals.

SUMMARY OF THE INVENTION

This invention provides a method and apparatus for greatly simplifying debugging of hardware/software systems. The method and apparatus provide the capability of collecting data structures in a memory dump taken for a hardware/software system into logical data tables stored in a database. Once data structures of a memory dump are transformed into logical tables, then a standard database management system can be used to operate on the logical tables for analyzing the memory dump. For instance, combining data structures into logical tables allows an analyst to explicitly link such logical tables for data structures that are linked. A standard database management system permits querying data stored in logical tables for relatively easy determination of a cause of a system crash.

From a process standpoint, a preferred embodiment of the invention comprises the following steps executed by a processor having a memory. Storing in the memory a data structure definition of a type contained in a memory dump. Storing in the memory an address of a first data structure, where the data structure is of the stored type. Populating a logical table in the memory with the contents of the first data structure at the address in accordance with the data structure definition. Storing in the memory a link for linking the first data structure with a last data structure of the type contained in the memory dump. Storing in the memory an end logic of the last data structure. Finally, populating the logical table with the contents of the last data structure in accordance with the link and the end logic.

From a system standpoint, a preferred embodiment of the invention comprises a database management system, a template library, and an extraction logic specifier. The extraction logic specifier is coupled to the template library and to the database management system. A purpose of the extraction logic specifier is to generate an extraction table for populating by use of the template library and the extraction table the logical table with data in a data structure in a memory dump. The database management system is for operating on the logical table.

BRIEF DESCRIPTION OF THE DRAWINGS

FIG. 2 is a logical table, according to the embodiment of FIG. 1.

FIG. 6 is an extraction table, according to the embodiment of FIG. 1.

DETAILED DESCRIPTION OF PREFERRED EMBODIMENTS

System Overview

A presently preferred embodiment of the present invention is a support tool that aids the analysis and diagnosis of software/hardware (i.e. system) problems. Specifically, this embodiment uses memory dumps associated with system problems and presents them to an analyst in a relational database format. In a relational database, data is presented in table format. As further described below, in a relational database system, analysts have at their disposal mechanisms to operate on existing tables to, for example, generate new tables from data contained in the already existing tables. In this embodiment, a relational database contains a logical table for each type of data structure selected from data structures in the memory dump. Some of the logical tables can be explicitly linked by a user with a database management system.

Figure 1:
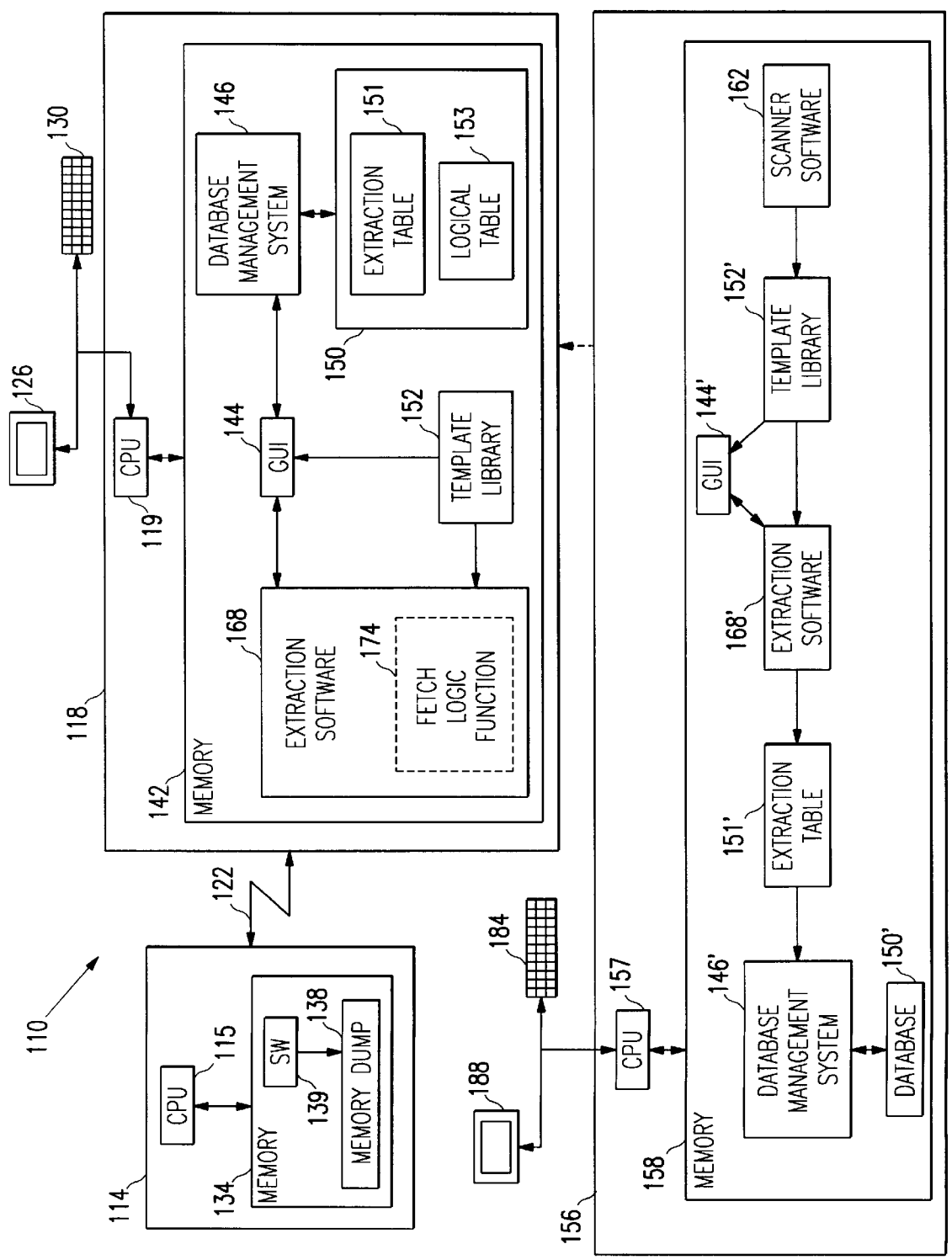
FIG. 1 shows a system for combining data structures in a memory dump into logical tables, according to a preferred embodiment of the present invention.

The following explains a method and apparatus for combining data structures in a memory dump into logical tables. FIG. 1 shows a preferred embodiment of this system. FIG. 1 illustrates a hardware/software system 110. Preferably, system 110 includes a server 114, which has a CPU 115, and a client 118, which has a CPU 119. The server 114 is a computer sufficiently powerful to rapidly process large memory dumps 138, as described further below. Preferably, software in the server 114 for retrieving data in the memory dump 138 is written in the C high-level computer language. Preferably the client 118 is a personal computer having an Intel 80486 processor with a memory 142, although any appropriate processor could be used. The CPU 119 executes software stored in the memory 142. In addition, preferably there is an operating system, such as MS-DOS (4.1 or above) (MicroSoft-Disk Operating System made by Microsoft Corp.) and MS-WINDOWS (3.1 or above) (MicroSoft Windows is made by Microsoft Corp.) stored in memory 142 of client 118.

Client memory 142 preferably contains a compression/decompression utility, such as PKzip and PKunzip made by PKWARE, Inc. The compression/decompression utility is used to send files between the client 118 and a computer 156, discussed below. PKzip compresses files and Pkunzip decompresses them.

A standard communication software package, such as RSC (Remote Server Call), which was developed by TANDEM Computers, Inc., preferably connects the server 114 and the client 118. The standard communication package makes possible procedure calls by the client 118 to the server 114. Communication is via a computer network 122 preferably using a standard protocol, such as TCP/IP (Transmission Control Protocol/Internet Protocol). The client 118 is connected to a monitor 126, a keyboard 130, and a mouse (not shown). The server 114 has a memory 134 for storing a memory dump 138 taken from software 139. CPU 115 executes software stored in memory 134.

Stored in the memory 142 of the client 118 is a graphical user interface software (GUI) 144 and a standard database management system 146, such as MS Access made by Microsoft Corp. The graphical user interface 144 is written in Visual Basic, which is a version of BASIC from Microsoft Corp. In addition, memory 142 stores a template library 152, which is a text file, and a database 150, which contains an extraction logic specifications table ("extraction table") 151 and a logical table 153, e.g., the logical PCB table 210 of FIG. 2. Also, an extraction logic specifications software ("extraction software") 168 is stored in memory 142. Extraction software 168 includes fetch logic functions 174.

Another computer 156 has a CPU 157 and a memory 158 that includes scanner software 162. The CPU 157 executes software stored in memory 158. In another embodiment, the scanner software 162 is stored in another memory for execution by yet another computer. The computer 156 preferably is a personal computer of similar power as the client 118. The memory 158 of the computer 156 further contains a template library 152' generated by the scanner software 162 from an unstripped version of software 139. In addition, memory 158 contains an extraction logic specifications software ("extraction software") 168' coupled to the graphical user interface (GUI) software 144'.

The GUI software 144' accepts inputs from a user and stores them in a memory buffer (not shown). The extraction software 168' also is coupled to the template library 152'. The extraction software 168' generates the extraction logic specification table ("extraction table") 151' from information stored in the template library 152' and information stored by the GUI software 144' in the memory buffer. The extraction table 151' is stored in a database 150', which is managed by a standard database management system 146', such as MS Access. The computer 156 ships copies of the template library 152' and of the database 150' containing the extraction table 151' to the client 119. Coupled to the computer 156 are a keyboard and a monitor 188. A person of ordinary skill in the art will understand that memories 134, 142, and 158 also contain additional information, such as application programs, operating systems in addition to those shown, data, etc., which are not shown in FIG. 1 for the sake of simplicity. Moreover, memories 134, 142 and 158 can comprise RAM, or ROM, or hard disk, or another type of memory device, or a combination thereof.

The following paragraphs describe logical tables 153. It is the goal of the present invention to create logical tables 153 from information in the memory dump 138. As further explained below, in this embodiment, data structures, such as a linked list of PCB's (process control blocks), are mapped onto a logical table 210, as illustrated in FIG. 2. Stated differently, the logical table 210 of FIG. 2 collects into a single table all of the PCB's of the memory dump. As mentioned above, data structures, such as PCB's, typically are scattered throughout a memory of a system. Locations of the fields of a logical table do not represent physical memory locations. The logical table 210 is a table of all PCB's in the memory dump, where each row in the logical table is dedicated to a PCB, i.e., to a single process. In the logical table 210, the PCB column 214 contains all of the numbers of the PCB's that are present in the memory dump. Each row 218 of the logical table 210 has several entries, such as the PCB process identification number (PIN) 226, the priority of the process 230, the run time of the process 234, and the number of files open 238 in the PCB 214. Generally each PCB 214 will have different values for these entries. Other data structures in the memory dump also are mapped onto logical tables, similar to the data structure shown in FIG. 2.

To permit an analyst to operate on a logical table, this embodiment includes a standard data base management system 146,146' which is preferably Microsoft Access (MS Access) made by Microsoft Corporation. Database management system 146 permits querying data stored in logical tables. With such a querying mechanism, an analyst can operate on logical tables for easy determination of a cause of a system crash. For instance, as is well known in the art, the analyst can operate on the logical table 210 to extract a subset of the table 210 to generate a new table of, for example, all PCB's with a certain priority 230. Whereas, as mentioned above, in a non-database environment, the analyst has to painstakingly traverse all PCB's in the memory dump one at a time and find those that satisfy the constraint of this priority 230.

Other examples of types of data structures represented by logical tables are PCBX tables and DCT's (destination control tables). PCBX stands for PCB extended. PCBX's contain data beyond that already contained in PCB's. For example, a logical PCBX table includes a column for MOM's and a column for flags. A MOM is a creator of a process, which is typically another process. A flag is typically a "yes/no" indicator. In a PCBX table, each row is dedicated to an individual PCBX data structure, as is true for the logical PCB table 210.

In a logical DCT, similarly to the PCB and PCBX tables, each row in a DCT is dedicated to a single process. Each process listed in the DCT is a process that is active in the system at the time of taking the memory dump. A logical DCIT contains additional attributes of a process, such as a column for the names of the process and a column for a process identification numbers (PIN) of the process. Of course, the PCBX table and the DCT can contain additional important attributes of processes.

The database management system 146 provides the ability to join logical tables in a relational database. However, to join tables, each table has to contain at least one column that is identical to all tables, such as a column with PIN's. So, for example, a user joins tables by attaching rows (from the tables) having the same PIN values. As a result of the joining, the three tables PCB, PCBX, and DCT can be viewed as a single logical table. This makes possible for the viewer to view a particular PCB along with its flag, MOM info, PID, and name. Fields within this new logical table can then be extracted and viewed separately. In other words as mentioned above, tables can be created from the logical table by extracting subsets of the logical table. Consequently, by combining data structures in a memory dump into a relational database, the power of a database management system is unleashed to greatly simplify an analyst's task of analyzing crashes, as described in additional detail below.

As mentioned above, some data structures in a memory dump are linked. For example, segment (SEG) data structure is linked to a segment page table (SPT) data structure. Typically, a SEG, which is represented by a SEG data structure, occupies a large part of a memory dedicated to an operating system. SEG's are broken into pages, each of which occupies a smaller part of that memory. An SPT contains information on a particular page of a corresponding SEG. An SPT data structure is representative of an SPT. As is true for data structures in this embodiment, data structures representative of SEG's and SPT's are organized into logical tables.

Figure 3:
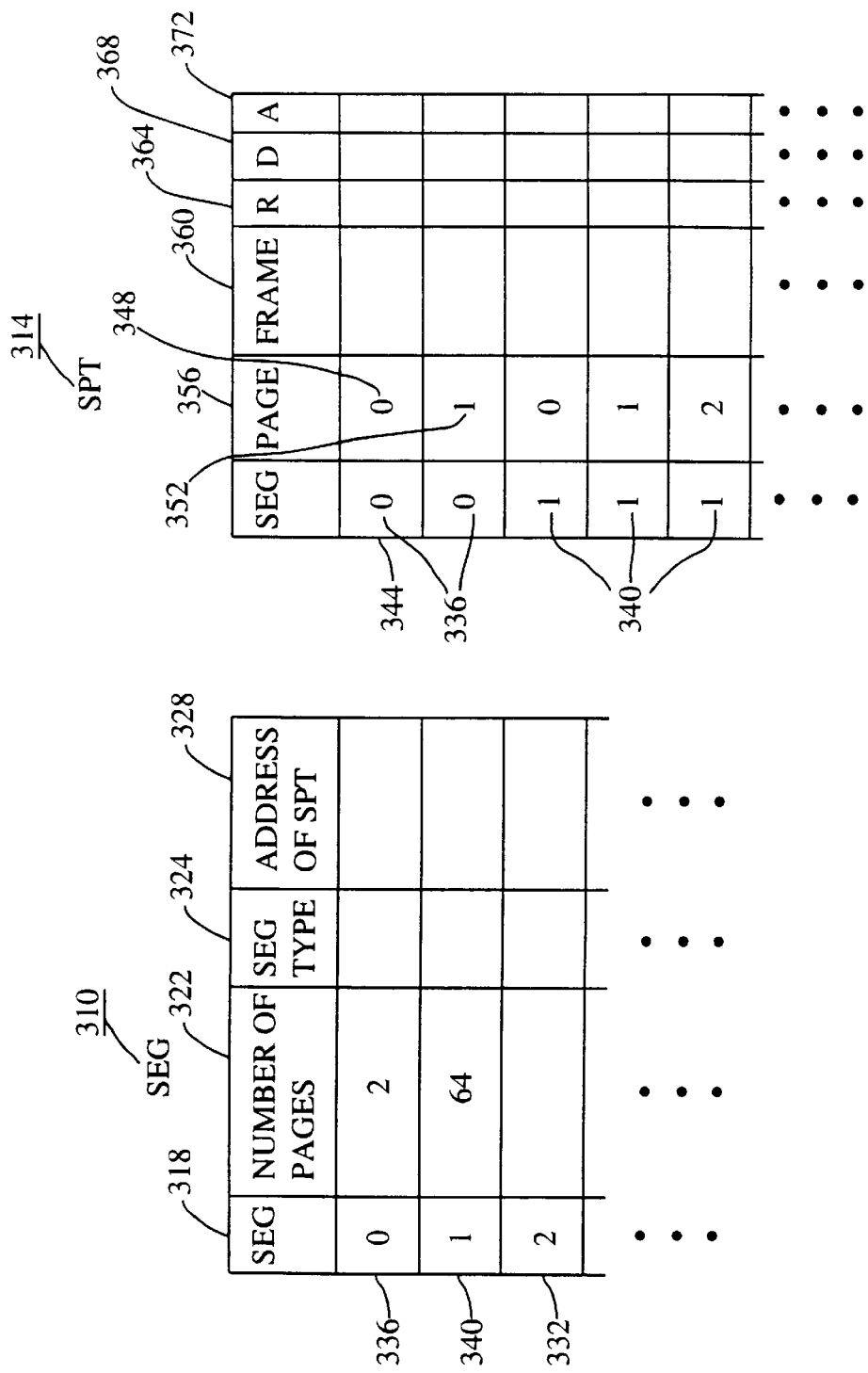
FIG. 3 shows explicit links between logical tables, according to the embodiment of FIG. 1.

In this embodiment, links between data structures can be made explicit by the user using the database management system 146. FIG. 3 illustrates explicit links between a logical SEG table 310 and a logical SPT table 314 stored in the logical table 153 of FIG. 1. The logical SEG table 310 contains four columns: a SEG number column 318, a page column 322 containing a number of pages for the particular SEG 318, a segment type column 324, and an SPT address column 328, as discussed below. For simplicity, the SEG table 310 contains only three rows 332, 336 and 340. Similarly to the rows in the PCB table 210, each row, e.g., 332 is dedicated to a single data structure, i.e., an SEG. Also, for illustrative purposes, the number of pages associated with SEG zero 336 is only two, while the number of pages for SEG one 340 is sixty-four. Also for simplicity, the logical SPT table 314 is shown with only five rows 344, where each row is dedicated to a single page of a particular SEG.

The following illustrates explicit links between the SEG table 310 and SPT table 314. Since the number of pages 322 for SEG 336 is two, only the top two rows 344 in the logical SPT table 314 are dedicated to the pages of SEG zero 336. The first row of the logical SPT table 314 is dedicated to page zero 348, while the second row in the logical SPT table 314 is dedicated to page one 352 of SEG zero 336. Similarly, the next sixty-four rows, only three of which are shown 340, are dedicated to the pages zero, one, and two of SEG one 340.

Explicitly linking the logical tables 310 and 314 through the SEG field provides an analyst with a simple view of how the SEG and the SPT data structures are connected. In a standard database management system, the analyst can join, as explained above, these explicitly linked tables into a single table. To illustrate, in this single table, the first row is made of the first row 336 in the logical SEG table 310 joined with the first row 344 in the logical SPT 314. The second row is made again of the first row 336 in the logical SEG table 310, joined with the second row in the logical SPT 314.

In the logical SPT table 314, the page column 356 lists logical pages, a well known concept in virtual memory implementations, whereas the frame column 360 lists the physical addresses of the pages. The R, D, and A columns, 364, 368, and 372, respectively contain further attributes of pages. The R column 364 contains single bit flags that indicate whether a page has been referenced. The D column 368 indicates whether the page is "dirty," i.e., whether or not it needs to be written to disk. The A column 372 indicates whether a page is absent. These attributes are well known concepts associated with virtual memory.

Figure 4A:
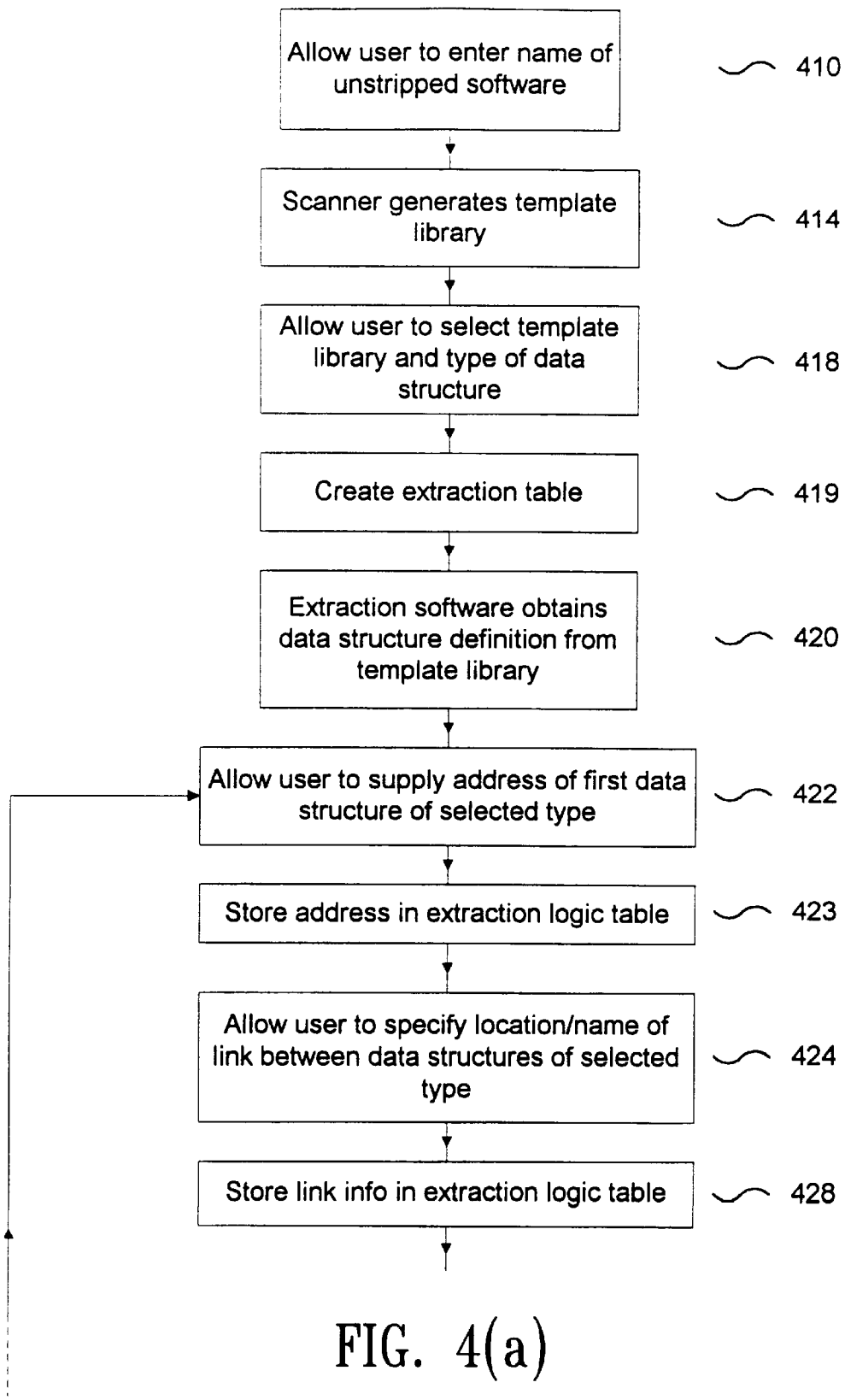
FIGS. 4(a) and 4(b) are flow charts of steps performed by the system illustrated in FIG. 1.
Figure 4B:
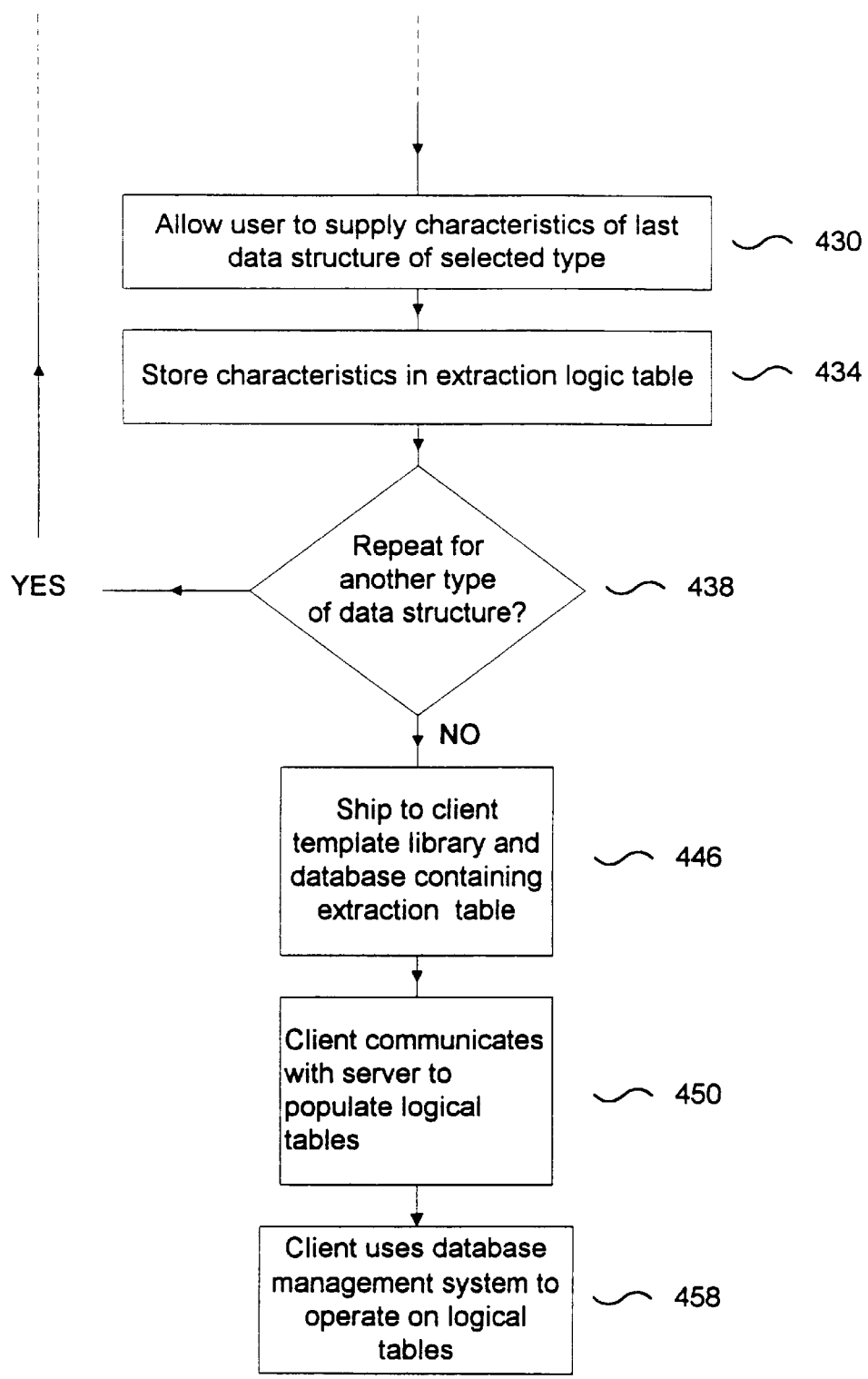

FIGS. 4(a) and 4(b) are flow charts of steps performed by the system illustrated in FIG. 1 to generate a template library 152 and an extraction table 151 with which to populate logical tables 153. The CPU 157 executes the scanner software 162 in its memory 158. In step 410 of FIG. 4, the scanner 162 prompts a user to enter a name of the software 139 for which a memory dump was taken. The software is an unstripped object code version of the software 139.

An unstripped version of the software 139 contains definitions of all data structures used by software 139. These definitions are kept in a symbol table of the unstripped object code of software 139. A data structure definition exactly describes the data structures by defining each component of the data structure. Such a definition includes field names, sizes, and types of the data structure. The scanner 162 extracts all of the data structure definitions from symbol tables in the software, as is well known in the art. In step 414 the scanner 162 generates template library 152. Template library 152 is a text file in the memory 158 used by the scanner 162 to store the definitions of the data structures.

Figure 5:
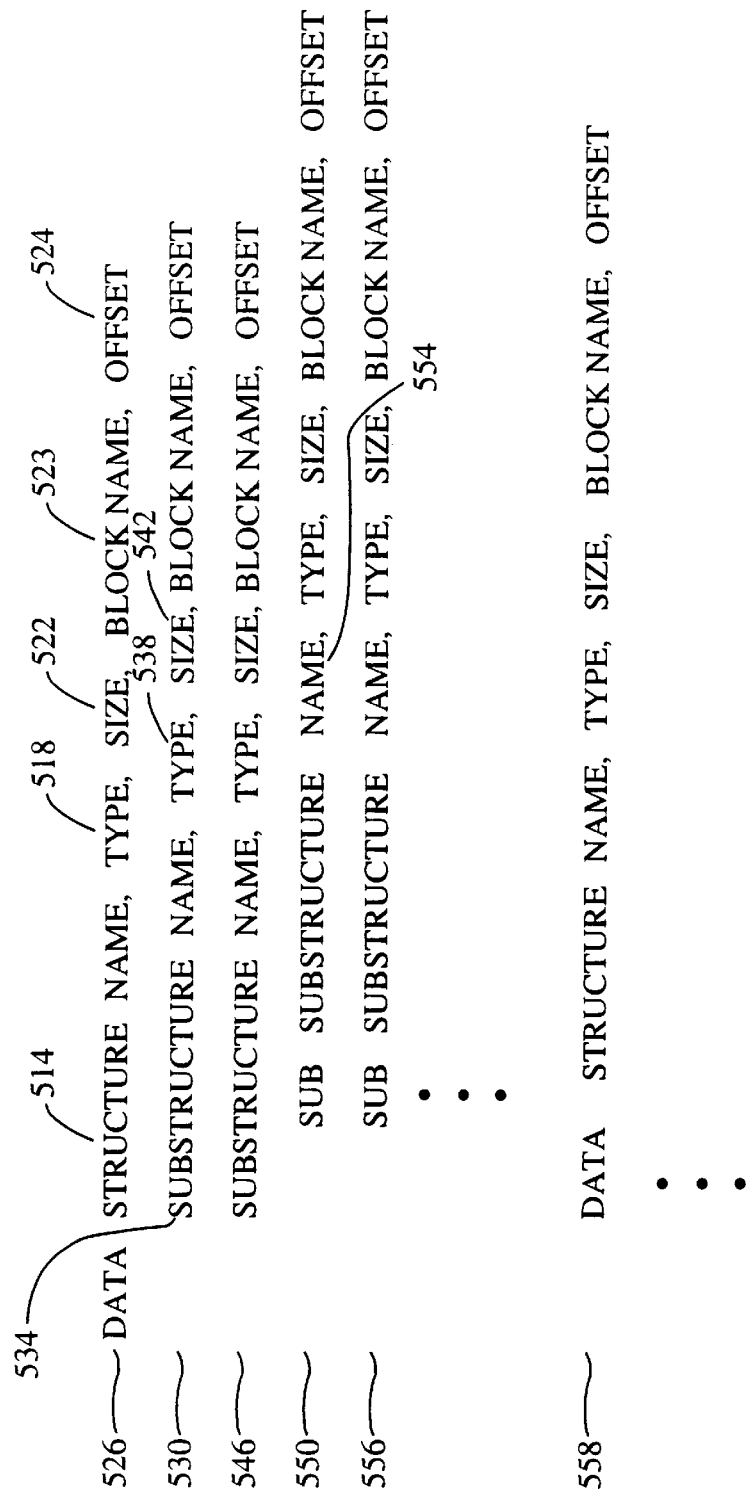
FIG. 5 is a template library, according to the embodiment of FIG. 1.

An example entry in template library 152 is illustrated in FIG. 5. In a first part 526 of the template library 152, data structures are described by a data structure name 514, a data structure type 518, a data structure size 522, a block name 523 in memory, and an offset 524 in the block of block name 523. An example of a data structure name 514 is ZPCB, i.e., a name of a PCB. An example of a type of data structure 518 is a PCB. APCB is an example of a complex type of data structure. A complex type of data structure has, for example, more than one field (e.g., PIN 226, number of files open 238) or contains another complex data structure. Of course, a data structure type can also be primitive, as discussed below. An example of the size 522 of the data structure is 16,256 bytes. A block name 523 depends on the type of block in memory to which the data structure 514 is assigned. Memory 134 usually is divided into two different types of blocks: a global block, which is accessible to all processes, and local blocks, each of which is accessible only to a single process.

A second part 530 in the template library 152 is for specifying fields in the data structure specified in the first part 526. A substructure name 534 can be the name of a field, such as run time 234. Here the type of the substructure 538 can be primitive such as an integer, a real number, or a string. The size of a substructure name 542 is provided in bytes. Typically, there are more than one field in a type of a data structure. Therefore, a third part 546 appears in the template library 152 of FIG. 5. In the third part 546, another field, such as priority 230 in the data structure of type 518 is specified with a substructure 534, type 538, and size 542 combination.

For the case when, for instance, a data structure type has additional substructures, then a fourth part 550 is used. In the fourth part 550 a substructure name 554 can be used, for example, when a substructure, such as priority of process 230, is further subdivided into two substructures, such as priority of a primary process and priority of a backup process. Then the priority of a primary process and a priority of a backup process substructures are described in part 550 and part 556, respectively, using the same kind of information, as was used in the previous parts. Of course, additional data structure types can be specified in the template library, as shown by part 558 in the template library 152.

In step 418, the GUI software 144' allow the user to select a template library 152' and a type of data structure. In step 419, the extraction software 168' creates through the database management system 146' the extraction table 151' in the database 150'. In step 420, the extraction software 168' obtains the data structure definitions in the template library 152'. As mentioned above, eventually, a copy of the extraction table 151' is transferred as indicated by the dashed arrow in FIG. 1 to the memory 142 of the client 118.

An example of entries in an extraction table 151 (or 151') is illustrated in FIG. 6. The extraction table 151', 151 contains the following information: the name of a data structure 514, an object name 610, a size 522, a step number 614, a sub step number 616, a fetch logic value 618, and parameters 622. The name of the data structure 514 is the same name as in the template library 152. Only two types of data structures are illustrated, one for a PCB and one for a SEG. Nevertheless, many more data structures can have their extraction logic defined in the extraction table 151. The object name 610 is the name of a template library 152. Together, the name 514 and the object name 610 point to the data structure definition in the template library 152. The size 522 of the data structure is obtained by the extraction software 168 from the template library 152. The step number 614 and the sub step number indicate the number of steps and sub steps required to extract data from the memory dump 138, as further discussed below.

In this embodiment, as shown in Table I, the fetch logic 618 can have eleven possible values, depending on selections made by a user in display screens discussed below. In Table I, the numbers in parentheses refer to buttons that the user can click in various screens displayed by the GUI software 144'. As already mentioned, the GUI software 144' stores the user's selections in the memory buffer (not shown). These selections include the fetch logic, as well as parameters, discussed below. The extraction software 168 takes the user's selections from the memory buffer and stores them in the extraction table 151'. The extraction software 168 stores in the extraction table 151' a fetch logic value from zero to six for each left button, shown in screen 810, that the user clicks on (see FIG. 8). Fetch logic values 618 of seven to ten are associated with sub step numbers 616, as further explained below.

TABLE I

Fetch Logic

| Clicked Button | Fetch Logic |
|---|---|
| Specify Address (814) | 0 |
| Debugger (836) | 1 |
| Parent Structure (838) | 2 |
| Sub Structure (842) | 3 |
| User Defined Function (834) | 4 |
| Next Structure (848) | 5 |
| Tracer (854) | 6 |
| Instances of a Structure (1318) | 7 |
| Header Information (1326) | 8 |
| Absolute Value (1326) | 9 |
| Null Value (1326) | 10 |
| Extraction Table Parameters | |

Extraction Table Parameters

Steps 420–438 of FIG. 4 allow the user to fill in the extraction table 151'. As described below, the user specifies values to be placed in the extraction table 151' by using a Graphical User Interface (GUI) 144'.

Each parameter 622 in the extraction table 151 of FIG. 6 is an individual entry in the extraction table 151. These are a total of thirteen possible parameter columns (i.e. parameter names) in extraction table 151. As explained below, however, there are more than thirteen different types of parameters, because the meaning of a parameter in a particular column is a function of the particular fetch logic 618. The number of parameter names of thirteen is arbitrary. An advantage, of keeping constant the number of parameter names is that the extraction table 151 can be created with a fixed number of fields. Therefore, the size of the extraction table is fixed. When a parameter column 626 is not used, the extraction software 168 leaves the entry in that column 626 blank or inserts a negative one.

The following discusses the parameters associated with each fetch logic. With respect to fetch logic 0,1,2,3,4, and 6, an objective is to extract from the memory dump 138 a pointer to the address of a first instance of a selected type of data structure ("pointer to the first instance"). Fetch logic zero is discussed first, because it is the one typically used. Fetch logic four and one are discussed next, because they relate to separate functions. Fetch logic 5, 7–10 are discussed last, since they pertain to end logic, as discussed below. Table II shows the parameters for fetch logic zero. The number in parentheses in the description column of Table II and other tables shown further below refer to display screens discussed below.

TABLE II

Figure 8:
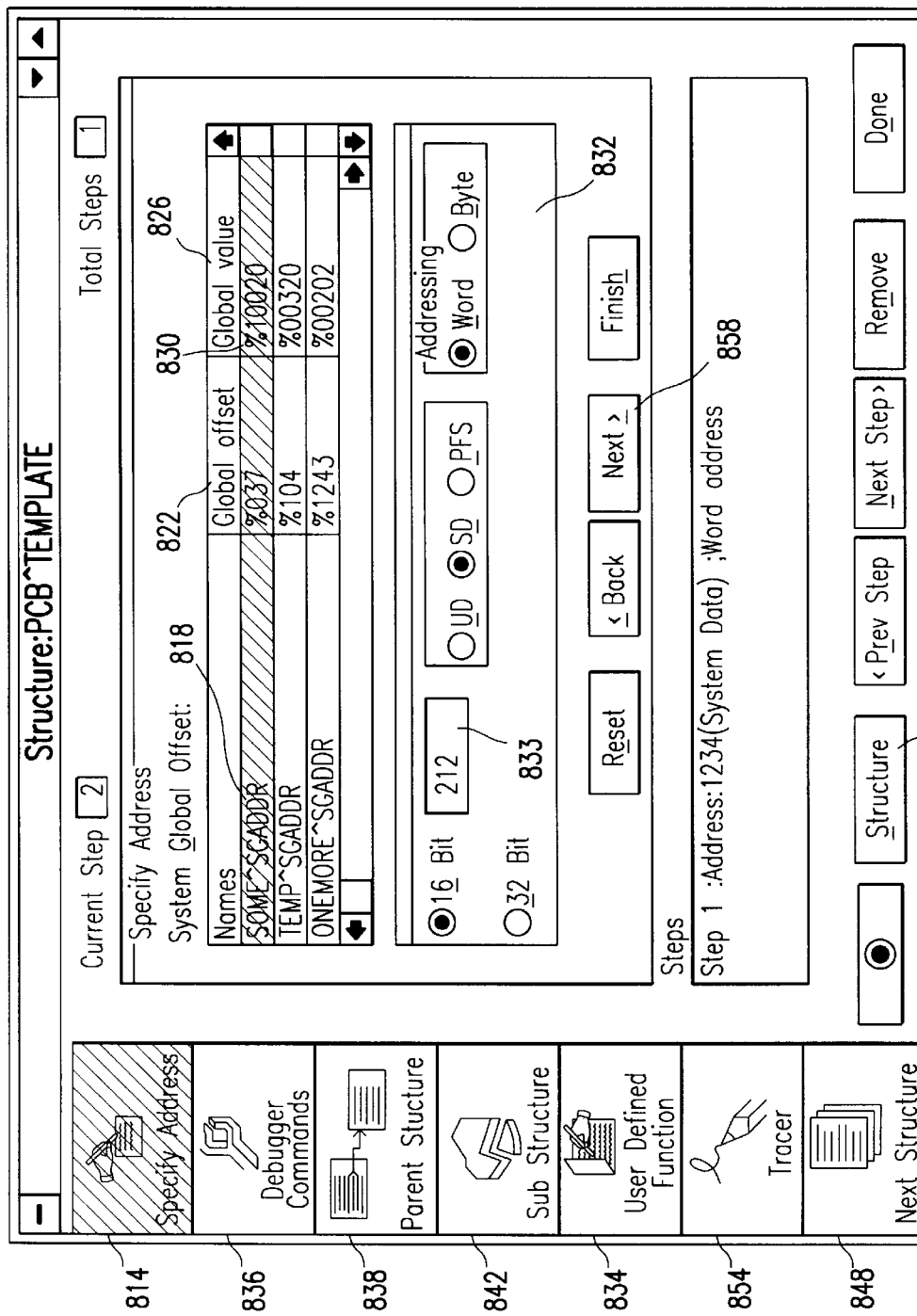
FIG. 8 shows a screen display displayed by the computer of FIG. 1 for prompting a user to select a location of a first data structure of a selected type, according to the embodiment of FIG. 1.

Fetch Logic = 0 (Specify Address, FIG. 8)

| Parameters | Description |
|---|---|
| Int1 | Result Type (832) |
| Int2 | Address Selected by User (822) |
| Int3 | Address Selected by User (2nd byte of Int2 Address) |
| Long1 | Address Entered by User (832) |
| Long2 | Address Entered by User (2nd byte of Long1 Address) |
| Int4 | Length of Result (Next ≧) (858) |
| Int5 | Pointer Start (Next ≧) (858) |
| Int6 | Pointer End (Next ≧) (858) |
| Int7 | Pointer Type (Next ≧) (858) |

Fetch logic zero can be used to obtain an address in the memory dump 138 of a first instance of a type of data structure or of other information, such as the total number of instance of the type of data structure, as explained further below in additional detail. For fetch logic zero, parameter Int1 reflects the type of address in the memory dump 138 of the pointer to the first instance. For example, parameter Int1 can indicate whether the address is a sixteen bit or a thirty-two bit word. Another parameter, parameter Int2 is an ofset in memory containing the address of the pointer to the first instance, as selected by a user from options displayed in, for example, screen 810 of FIG. 8, discussed below. A parameter Int3 is used by the extraction software 168, when the address of the pointer to the first instance is a thirty-two bit address.

Parameter Long1 represents the actual address of the pointer to the first instance, when that address is not selected but supplied by the user in screen 810 of FIG. 8. Parameter Long2 is used when the address of a pointer supplied by the user is thirty-two bits long. Parameters Int2 and Int3 are mutually exclusive with parameters Long1 and Long2. This means that when Int2 (and Int3) is used, then Long1 (and Long2) are not used. Sometimes, the address represented by parameter Int2 (and Int3) or Long1 (and Long2) is the address to an intermediate structure instead of to the pointer to the first instance. The intermediate structure itself contains the pointer to the first instance. Parameter Int4 specifies the length of the intermediate structure located at the address specified by Int2 (and Int3) or Long1 (and Long2). Parameter Int5 represents the start location of the pointer within the intermediate structure. Parameter Int6 represents the end of the pointer in the intermediate structure. Similarly to Int1, parameter Int7 specifies the type of the pointer located in the intermediate structure. Typically, however, parameters Int4–7 are not used. Instead, the default is that the pointer to the first instance is a two byte pointer that starts at the address specified by the parameter Int2 or Long1. Int3 or Long2 are used as consistency checks.

Table III, shown below, lists the self-explanatory parameters for a user defined function for obtaining, for example, a pointer to the first instance of a data structure.

TABLE III

Figure 9:
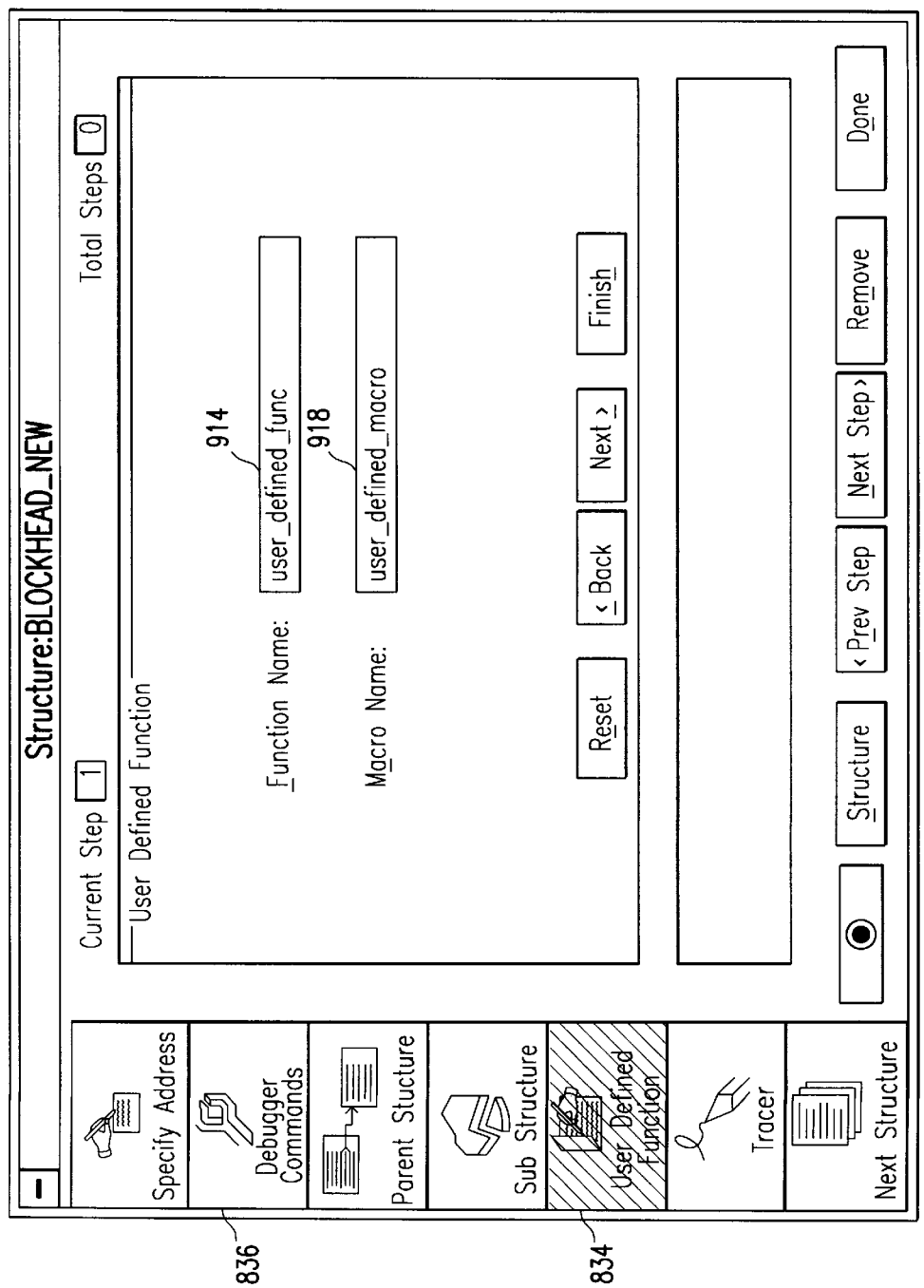
FIG. 9 shows a screen display displayed by the computer of FIG. 1 for defining a function for locating a first data structure of a selected type, according to the embodiment of FIG. 1.

Fetch Logic = 4 (User Defined Function, FIG. 9)

| Parameters | Description |
|---|---|
| Text1 | Function Name (914) |
| Text2 | Macro Name (918) |

Table IV below shows the parameters 621 for fetch logic one for using commands of a standard debugger for obtaining from the memory dump, for example, a pointer to the first instance. Fetch logic one can even be referenced by fetch logic four, as further discussed below.

TABLE IV

Fetch logic = 1 (Debugger Commands [not shown])

| Parameters | Description |
|---|---|
| Int1 | Result Type |
| Int2 | Result Start |
| Int3 | Result End |
| Int4 | Pointer Type |
| Text1 | Command Text |

Table IV shows the parameters that the client 118 uses to obtain the pointer to the first instance by sending a debugger command to the server 114. In Table IV, parameter Int1, similarly to parameter Int1 for fetch logic zero, represents the type of the result (character or binary) obtained by the debugger command. The result is a string that is returned to the client 118 following the execution of debugger software of the server 114 of the command text as represented by the parameter Text1. Int2 is the parameter that represents the start address (within the result) of the pointer obtained by the debugger command. Int3 is the parameter 622 that represents the end of the pointer within the result. Int4 is the parameter 622 that represents the type of the pointer contained in the result described the parameter Int1. For instance, Int4 may represent the fact that the type of the pointer is a sixteen bit word or a thirty-two bit word.

Table V shows the parameters for fetch logic two for specifying, for example, an address of a first instance of a data structure by reference to a parent structure.

TABLE V

Figure 10:
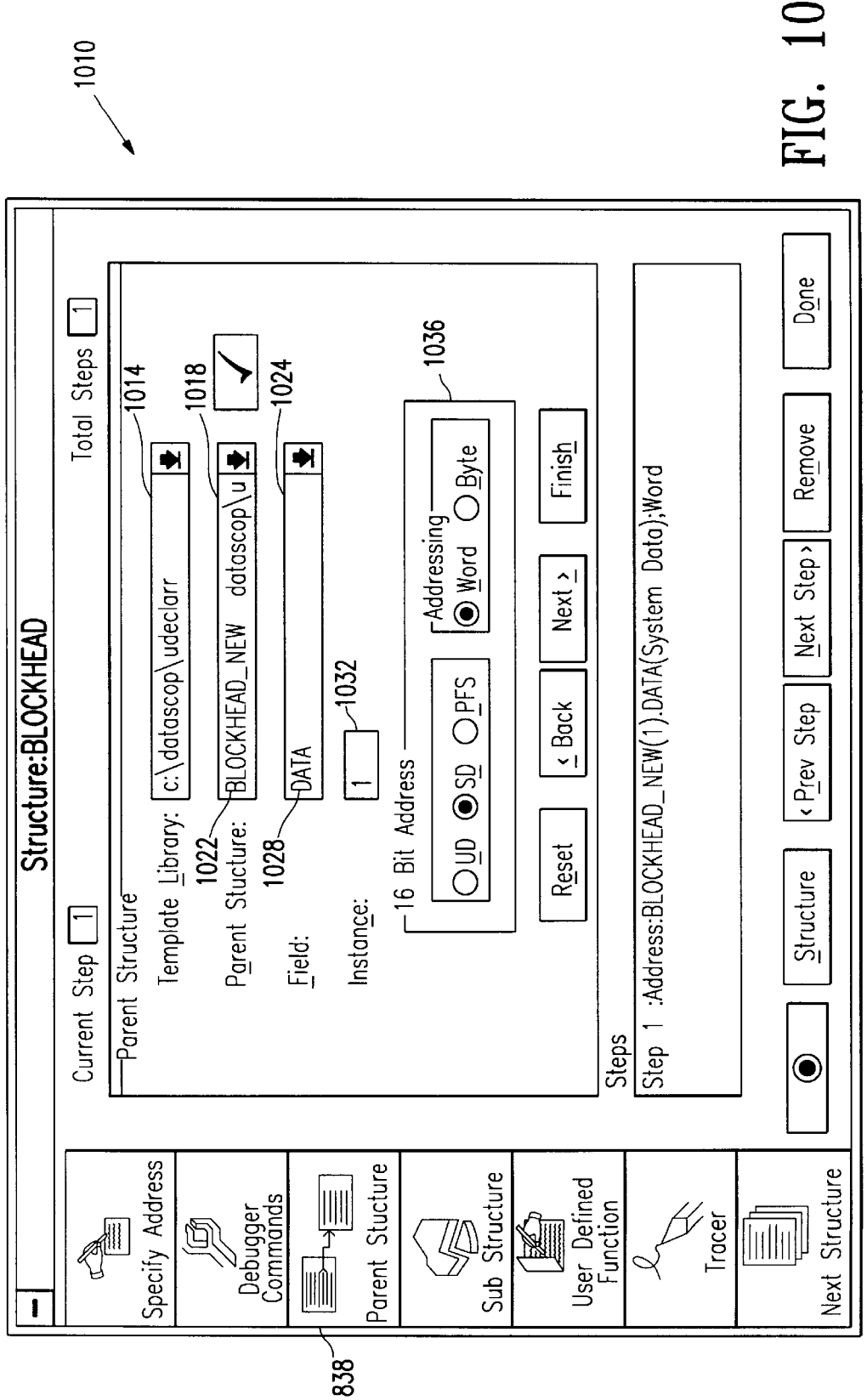
FIG. 10 shows a screen display displayed by the computer of FIG. 1 for allowing a user to designate an address of a data structure by reference to a parent data structure, according to the embodiment of FIG. 1.

Fetch Logic = 2 (Parent Structure, FIG. 10)

| Parameters | Description |
|---|---|
| Int1 | Offset (top level structure) (1022) |
| Int2 | Offset (within top level) (1028) |
| Int3 | Instance (1032) |
| Int4 | Type of Pointer (1036) |
| Text1 | Template Name Library (1014) |
| Text2 | Parent Name (1022) |
| Text3 | Field Name (1028) |

In Table V, parameter Int1 is the offset within template library 152 of the parent data structure (top level structure). Int1 specifies where, for example, part 526 in the template library 152 is located relative to other parts of the template library 152. As mentioned above, the GUI software 144', 144 is written in Visual Basic. Visual Basic permits indexing of items within a list. All data structure definitions are placed in a list and are thereby indexed. To obtain Int1 and similar offset parameters, an indexing feature of Visual Basic is used.

Parameter Int2 (also obtained by the indexing feature of Visual Basic) is an offset within the parent structure definition. Parameter Int3 is the offset where the field is described that contains the pointer to the first instance. Parameter Int4 is the type of the pointer to the first instance, similarly to parameter Int7 in Table II. Parameter Text1 is the name of the template library 152 that contains the parent structure. Parameter Text2 is the name of the offset specified by parameter Int1. Parameter Text3 is the name of the offset specified by parameter Int2.

While parameters Int1 and Int2 may vary from release to release of software 139 for which the memory dump 138 is taken, the names as specified by parameters Text2 and Text3 typically do not vary. Therefore, parameters Text2 and Text3 serve as consistency checks for the parameters Int1 and Int2. If parameters Text2 and Text3 and parameters Int1 and Int2 do not point to the same names in the template library 152, then the client 118 relies on parameters Text2 and Text3. However, parameters Int1 and Int2 are useful in quickly locating a relevant offset, because parameters Int1 and Int2 are integers, which can be processed quickly by computers.

Table VI, shown below, lists the parameters for fetch logic three. Fetch logic three is for specifying an address of a first instance of a type of a data structure by reference to a substructure.

TABLE VI

Figure 11:
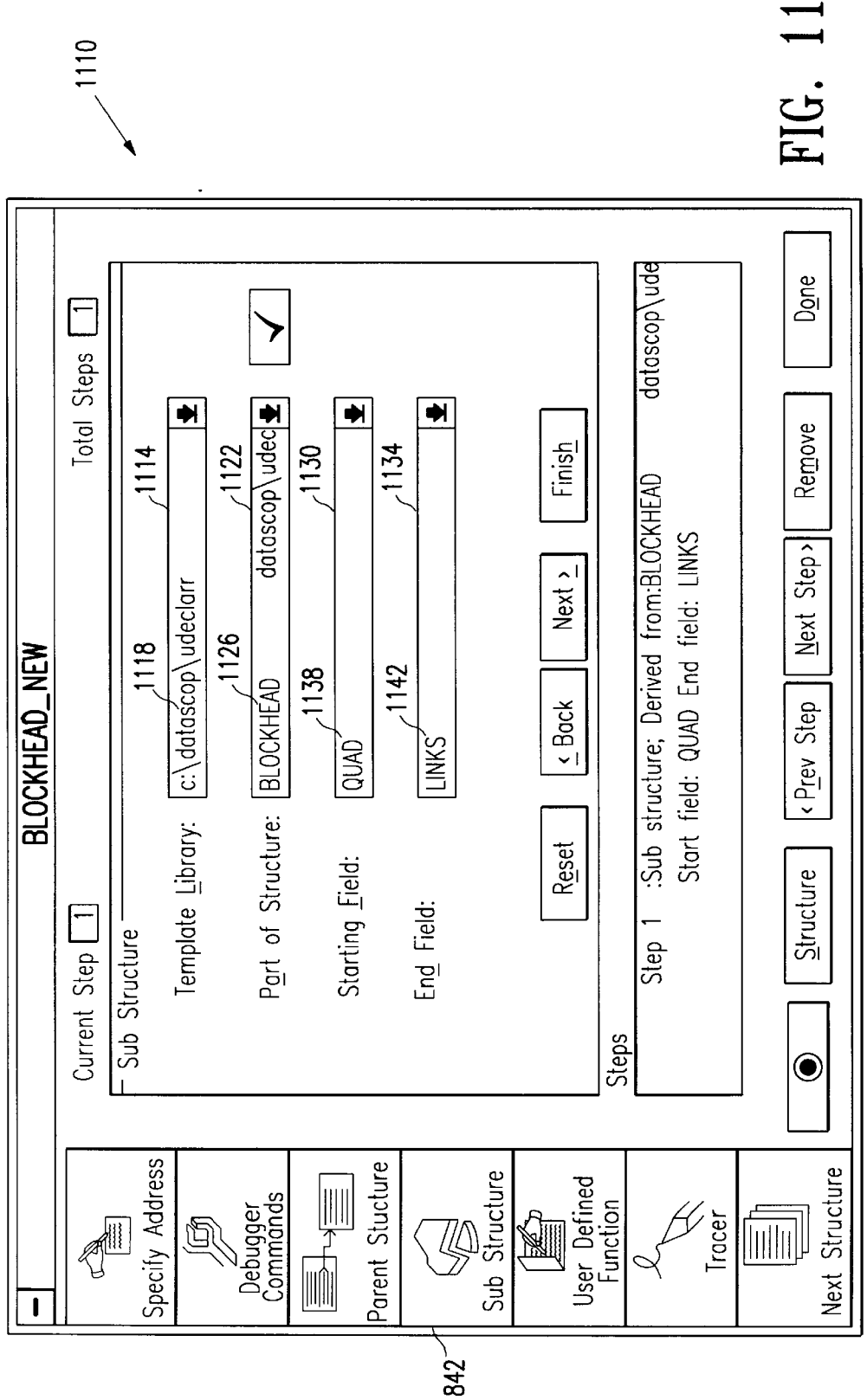
FIG. 11 shows a screen display displayed by the computer of FIG. 1 for allowing a user to select a substructure, according to the embodiment of FIG. 1.

Fetch logic = 3 (Substructure, FIG. 11)

| Parameters | Description |
|---|---|
| Int1 | Offset (within template library) (1126) |
| Int2 | Start Offset (1138) |
| Int3 | End Offset (1142) |
| Text1 | Template Library Name (1118) |
| Text2 | Parent Name (1126) |
| Text3 | Start Offset Name (1138) |
| Text4 | End Offset Name (1142) |

Table VI is similar to Table V. Parameter Int1 is the integer offset (obtained by use of Visual Basic's indexing feature) within the template library 152 of the selected type of data structure (parent). Parameter Int2 is the offset of the substructure within the parent structure definition at which the substructure definition starts. Parameter Int3 is the integer offset of the end of the substructure definition within the parent structure definition. Text1 is the name of the template library 152 that contains the parent structure definition. Text2–4, similarly to parameters Text2–3 of Table V, are the names of the parameters Int2–4, respectively.

Table VII, shown below, lists the parameters for use by tracer software in locating a pointer to an instance of a type of data structure.

TABLE VII

Fetch logic = 6 (Tracer [not shown])

| Parameters | Description |
|---|---|
| Int1 | Source of Pointer |
| Int2 | Offset within Source |
| Int3 | Pointer Type |
| Text1 | Procedure Name |

Parameter Int1 is an integer representative of the source of the pointer to the instance of a data structure. The source of the pointer Int1 can be, for example, a local variable, a parameter, or a register, each of which may be stored on a memory stack. Parameter Int2 is the offset within the source specified by parameter Int1. Parameter Int3 is the pointer type, similar to parameter Int7 in Table II. Parameter Text1 is the name of the procedure within which the tracer searches for the pointer to the instance of the data structure.

Table VIII shown below lists the parameters for fetch logic five for determining the next instances of data structures following the first instance of the data structure of a selected type.

TABLE VIII

Fetch Logic = 5 (Next Structure, FIG.'s 12 & 13)

| Parameters | Description |
|---|---|
| Int1 | Type of Link (1218) |
| Int2 | Index To Name of Field Containing Pointer (1224) |
| Int3 | Pointer Type (1240) |
| Int4 | Type of End Logic (1314, 1318) |
| Text1 | Name of Field at Int2 (1224) |

In Table VIII, parameter Int1 represents the type of link between instances of the selected type of data structure. An example of a type is a linking pointer used in linked lists. Parameter Int2 is an offset within the template library 152'. The part at that offset describes another offset within an instance of the selected type of data structure. At the offset within the instance of the data structure is a pointer linking one instance of a data structure to the next. Int3 is representative of the pointer type similarly to Int7 of Table II. Text1 is the name of the part in the template library at index Int2.

Parameter Int4 represents the type of end logic. As further discussed below, the type of end logic specifies the last instance of a type of data structure. To specify the actual end logic, the GUI software 144' stores in the memory buffer the user's end logic selections. The extraction software 168 takes the information from the memory buffer and creates a sub step in sub step column 616. The fetch logic value that the extraction software 168 enters in the sub step column 616 is a function of the selection that the user makes in logic block 1326 of FIG. 13. For instance, the user may specify the final instance of a type of data structure by specifying an address with the parameters of Tables II, IV, V. Then the fetch logic value of 618 would be zero, one, two, respectively. The user also can specify the last instance of the selected type of data structure by selecting a null value (1328) for a null pointer. Typically a null value is zero. Fetch logic ten is the fetch logic value 618 for selecting a null value. Fetch logic ten does not use parameters.

Table IX, shown below, lists additional parameters that the extraction software 168 can insert into the extraction table 151'. These parameters reflect a user's selection of the number of instances of a type of data structures. Again, the reference numbers in parentheses refer to display screens discussed below.

TABLE IX

Figure 13:
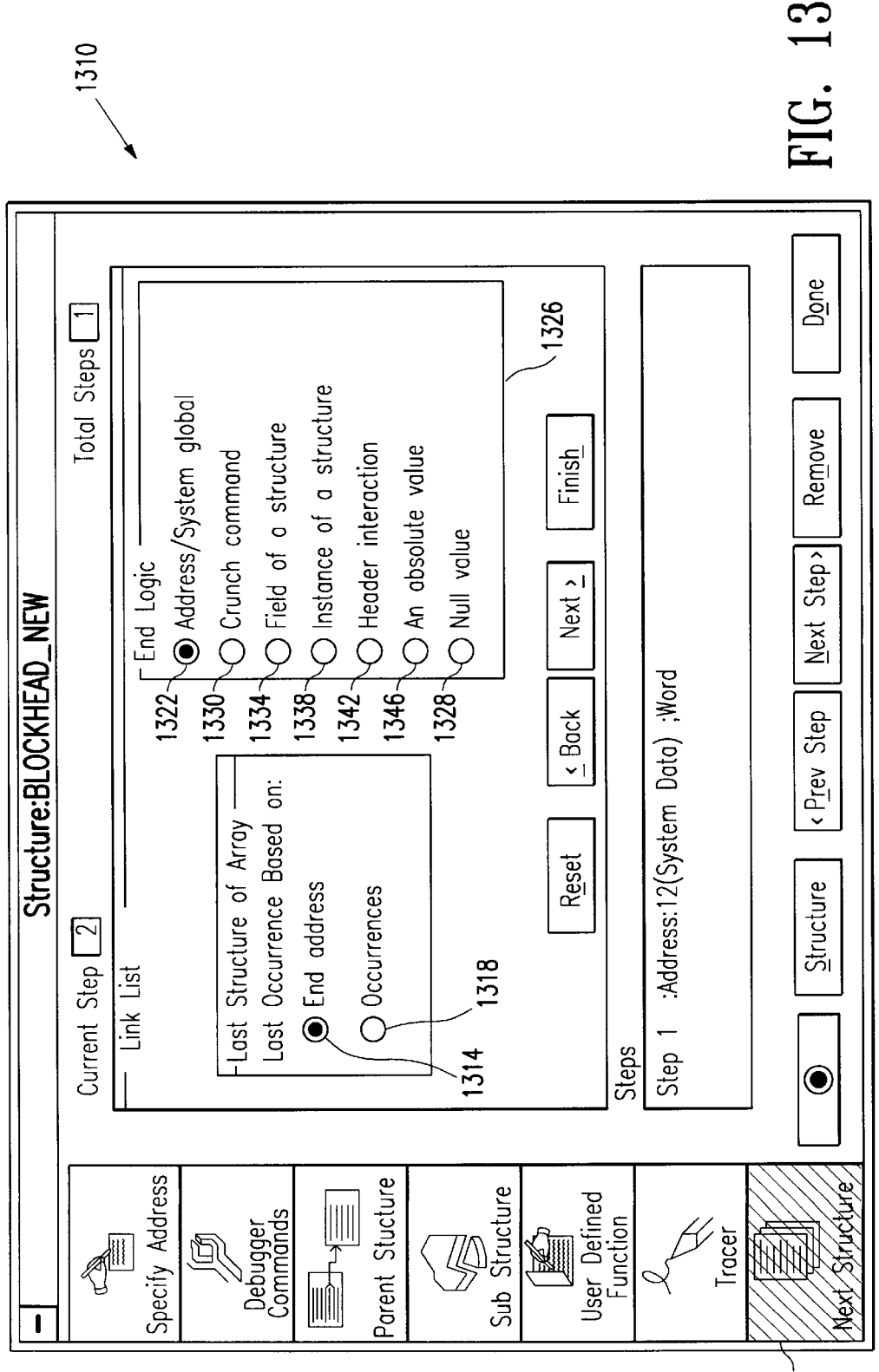
FIG. 13 shows a screen display displayed by the computer of FIG. 1 for allowing a user to select characteristics of the last data structure of a selected type, according to the embodiment of FIG. 1.

Method of Obtaining Numbers Of Instances Of Data Structure Type (1318 in FIG. 13)

| Fetch Logic | Parameters | Description |
|---|---|---|
| 0 | see TABLE II | (1322) |
| 1 | see TABLE IV | (1330) |
| 2 | see TABLE V | (1334) |
| 7 | Text1 | Template Library Name (not shown) |
| 7 | Text2 | Data Structure Type Name (not shown) |
| 7 | Int1 | Offset Within Template Library (not shown) |
| 8 | Int1 | Header Offset (1342) |
| 9 | Int1 | Absolute Value (1346) |

Similarly to Table VIII, in Table IX, several options are available to the user for specifying the number of instances of a type of data structure 1338. To specify the number of instances, fetch logic zero, one, or two can be used with the parameters listed in Tables II, IV, V respectively, as described above.

An additional option in Table IX is fetch logic seven. Fetch logic seven is for determining the number of instances of data structures of a selected type from the number of instances of a reference data structure. In fetch logic seven, the number of instances is equal to the number of instances of another structure. Parameter Text1 is the template library name that contains the definition of the reference data structure. Parameter Text2 is the name of the reference data structure in the template library of parameter Text1. Parameter Int1 is the integer offset to parameter Text2 within the template library 152' designated by parameter Text1. The part in the template library 152' at offset Int1 describes a field in the reference data structure that contains the number of occurrences that this reference data structure has.

Fetch logic eight determines the number of instances of a data structure type from a header stored just prior to a first instance of a data structure type in contiguous memory. The header location in the memory dump 138 is described by the part in the template library 152' at the header offset of parameter Int1. A header typically includes the total number of instances of contiguous types of data structures. The user provides in a screen the actual value for the parameter Int1. In another screen, the user can specify parameter Int1 of fetch logic nine, as shown in Table IX. In fetch logic nine, parameter Int1 is the absolute value of the number of instances of a type of data structure.

Data structures can be contiguous. As in Table IX, the user can specify in a screen (not shown) the number of instances of a particular data structure. In that screen, the user can select fetch logic 0–2, 7–9.

Display Screens for Specifying Contents of Extraction Tables

Figure 7:
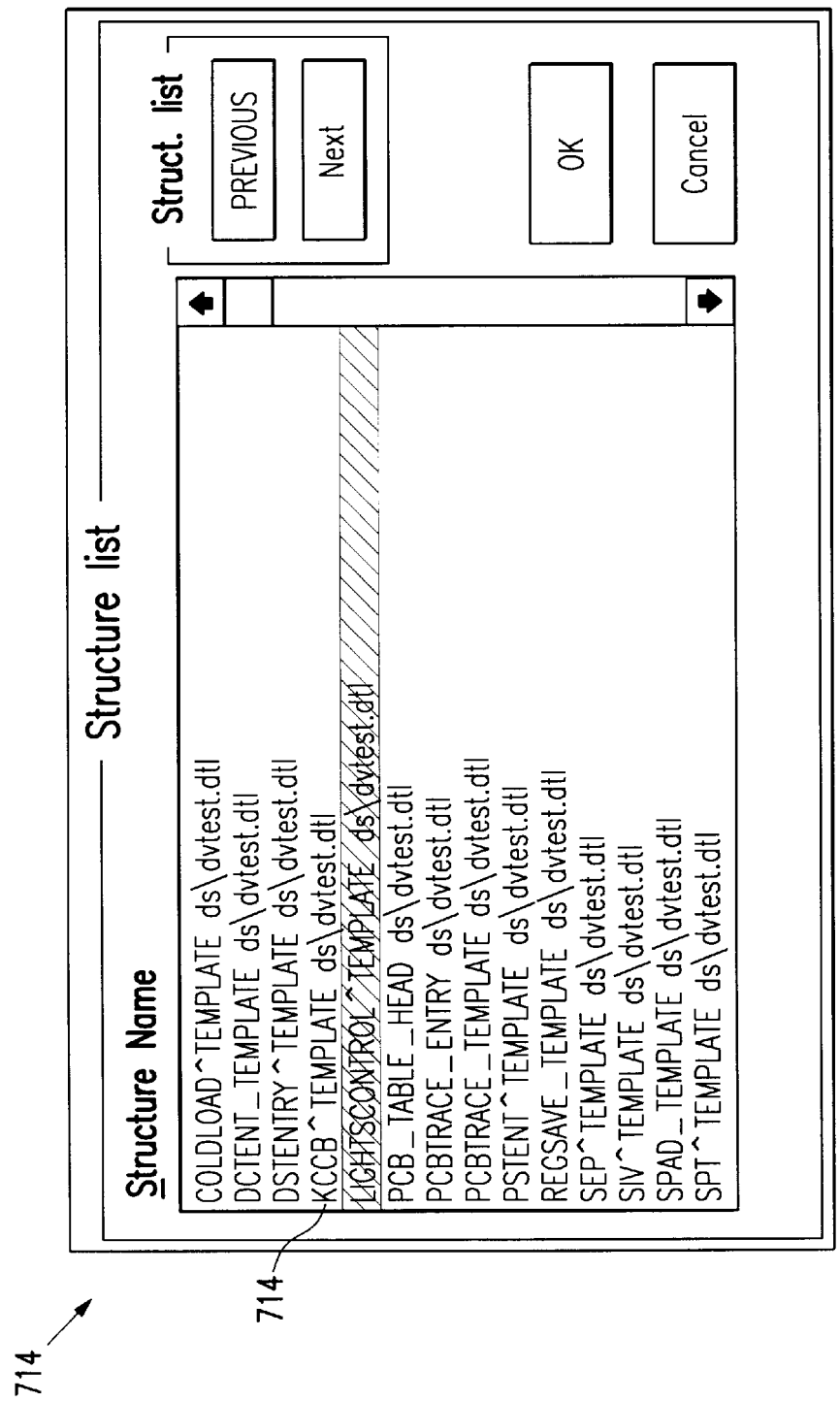
FIG. 7 shows a screen display displayed by a computer of FIG. 1 for allowing a user to select a type of data structure, according to the embodiment of FIG. 1.

FIG. 7 shows a display generated by GUI software 144' for selecting a template library 152'. To generate the extraction table 151', as mentioned above in step 418 of FIG. 4, the extraction software 168 allows a user to select the proper template library name 610 (see FIG. 6) and a type of data structure (by selecting its name 514), e.g. PCB or SEG type, with which to ultimately populate a logical table. Upon clicking on Structure button 808 of screen 810 of FIG. 8, discussed below, the GUI software 144' prompts the user to select a template library 152' from a list of template libraries in a template screen (not shown). The GUI software 144' will not prompt the user with a template screen, if the user already previously has clicked on button 808 and selected a template library 152'. Thereafter, the GUI software 144 lists on a screen 710 in FIG. 7 names 514, 714 of data structure definitions contained in the template library 152. To select a data structure type, the user can click on the name 514 of a data structure definition 714.

At the time a memory dump 138 is taken for a system, it is unknown how many data structures there were at the time of the system's crash. Typically memory is allocated dynamically during the execution of software. Memory is allocated dynamically because prior to the start of the execution of the software, it is typically unknown how many data structures will be needed during the execution of the software. For example, if only one process will be executed by the software, then only one PCB will be needed. However, if more then one process is activated, then more than one PCB will be needed.

In step 422 of FIG. 4, as explained in greater detail below, the GUI software 144' allows a user to specify a location of a first instance of a particular type of data structure that the user entered in step 418. In response, the user specifies an address, which is stored, in step 423, in a row in the extraction table 151', as also explained in additional detail below. As illustrated in FIG. 6, this row is dedicated to the selected type of data structure. FIG. 8 illustrates possible ways of allowing the user to specie this address. There are several buttons on the left side of the screen display 810 which can be clicked on with a mouse. In steps 422–438, each time such a button is clicked, the GUI software 144' stores in the memory buffer (not shown) a step number 614 beginning with step number "1" and increasing by one for each additional time such a button is selected. The extraction software 168 takes these step numbers and stores them in the extraction table 151', as illustrated in FIG. 6. Indeed, preferably, the GUI software 144' stores all data for the extraction table 151' in the memory buffer, from where the extraction software 168' obtains it for storage in the extraction table 151'.

The reason for numbering steps is that eventually when the client 118 proceeds to populate a logical table 153 with a type of data structure, the client 118 executes the extraction logic (i.e. information stored in the extraction table 151) in the extraction table 151 in the same order that the steps are numbered, beginning with step "1." In addition, once the user has clicked on a left button, the GUI software 144' stores in the memory buffer the proper fetch logic value 618. For instance, a fetch logic value 618 of "0" signifies that the user clicked on button "Specify Address" 814. In addition to the fetch logic value 618, the GUI software 144' inserts into the memory buffer the proper parameters 622 that together with the fetch logic 618 specify the extraction logic. The GUI software 144' determines these parameters 622 in accordance with the user's decisions in clicking on buttons of screen 810.

In screen display 810, a user has clicked on button 814 for specifying an address of a pointer to the first instance of a selected type of data structure ("pointer to the first instance"). The address can be, for example, an absolute address or a system global address. While the name of this pointer remains unchanged, its address can vary. When button 814 is clicked, GUI software 144' obtains from the template library 152' and displays on screen 810 data structures 818 that contain addresses of pointers to the first instance 822 in, for example, system global in the memory dump 138. The user specifies the address of the pointer to the first instance 822.

The address of the pointer to the first instance is an offset 822 in the memory dump 134. The user selects this offset 822 in step 422. Global Value 826 represents the contents of the memory dump 134 at the offset 822. The Global Value 826 is the actual pointer to the first instance. However, the Global Value 826 is available only when the computer 156 has access to the memory dump 138. When the memory dump 138 is available, the extraction software 168 obtains the Global Value 826 from the memory dump 138. Typically, the memory dump 138 is unavailable to the extraction software 168. Therefore, the Global Value 826 will not appear on screen 810. The Global Value 826 is obtained by the server 114 in response to a request by the client 118 in step 1642 of FIG. 16(b), discussed below.

To illustrate, in screen 810, the GUI software 144' displays a data structure name "SOME^SGADDR" 818. The user knows that the definition of this data structure 818 contains the offset 524 of the pointer to the first instance. The definition for the "SOME^SGADDR" data structure is stored by the scanner 162 in the template library 152'. The data structure definition for "SOME^SGADDR" is similar to those illustrated in the template library 152 of FIG. 5 at part 526. So, for the case of the "SOME^SGADDR" data structure, the data structure name 514 is "SOME^S-GADDR". The type 518 typically is a long integer (thirty-two bits), because "SOME^SGADDR" simply contains an address of the pointer to the first instance and does not have substructures 534. It follows, that the size 522 is four bytes. The block name 523 is global, meaning that the pointer to the first instance is stored in system global. The offset 524 is "%037". So, "%037" is the offset 524 of a pointer to a first instance. The percentage sign 830 indicates that the address is represented in octal base.

The parameters 622 stored in the extraction table 151' reflect the user's selection in screen 810. Per Table II, the GUI software 144' stores in the memory buffer (for storage in the extraction table 151' by the extraction software 168') the user selected offset 822 as parameter Int2. The user uses block 832 of screen 810 to qualify (parameter Int1) the address of the pointer 822. In block 832, as illustrated, the user has made address selections, such as clicking on the "16 Bit" button, the "SD" (system data) button (for segment selection; "UD" stands for user date and "PFS" stands for process file segment), and the word button, that determine the type of address of the pointer. This address selection determines the value that the GUI software 144' assigns to parameter Int1. Although the actual value of Int1 is arbitrary, Int1 is assigned an integer value of "1" in the case of the user's selection in screen 810, as illustrated in FIG. 8. Instead of specifying parameter Int2 (Int3), the user also can choose to insert in block 832 values for Long1 in block 833 (and for Long 2 upon clicking on radio button "32 Bit" in another block).

When the pointer to the first instance is actually contained within an intermediate structure that starts at the address 826 ("%10020" in FIG. 8), the user can specify parameters Int4–7 by clicking on button "Next≧" 858. Upon clicking on "Next≧" 858, the GUI software 144' displays another screen (not shown) where the user can specify parameters Int4–7. To illustrate, Int4 may be assigned a integer value of four. This means that the intermediate structure at address "%10020" 826 has four words. A value for parameter Int5 may be "2". This means that the pointer to the first instance starts with the second word of the intermediate structure. Parameter Int6 may have a value of "3". This means that the last word of the pointer in the intermediate structure is the third word. Finally, the user may assign a value of "0" to the parameter Int7. A value of "0" for parameter Int7 means that the pointer has 32 bits. Parameter Int7 functions as a consistency check for parameters Int5 and Int6. Typically, however, parameters Int4–7 are not used. Instead, the pointer has a standard length of two bytes starting at Int2.

Instead of specifying an address in global memory in step 422, which is the typical situation, the user can also define a function for locating the first address by clicking with a mouse on a User Defined Function button 834. Upon clicking on button 834, the GUI software 144' stores fetch logic value "4" in the memory buffer for insertion into the extraction table 151'. GUI software 144' also stores parameters 622 in the memory buffer in accordance with Table III.

To illustrate, FIG. 9 shows a screen display 910 displayed on the monitor 188 by GUI software 144' following a click on the User Defined Function button 834 of FIG. 8. The user specifies a function name in block 914 (parameter Text1). The user also specifies a macro name in block 918 (parameter Text 2). The function itself is typed by the user in another screen (not shown), which is provided by database management system 146'. The functions are written in, for example, Access Basic, as required by MS Access. Access Basic is a computer language produced by Microsoft Corporation for writing software for MS Access. The standard database management system 146' saves the user defined function under the names inserted at 914 and 918. As is well known in the art, the actual function 914 and the actual macros 918 are stored by standard database management system 146' in the database 150'.

Another button 836 of FIG. 8 allows a user to implement debugger commands (fetch logic value is "1") to specify an address of the first data structure of a particular type. It is well known in the art that standard software/hardware debuggers have commands for determining a pointer to the first instance of a data structure. Once the user has clicked on button 836, the GUI software 144' displays another screen (not shown) that permits the user to specify commands for a debugger to retrieve from the memory dump 138 the pointer to the first instance. The extraction software 168 stores these commands in the extraction table 151' (parameter Text1 of Table IV). The commands are in the form of text. The GUI software 144' also permits the user to specify parameters Int1–4.

In step 446 of FIG. 4(*b*), discussed below, the extraction table containing these character commands for the debugger is shipped to the client 118. In step 450, further discussed below, the client 118 passes the commands to the server 114. The server 114 executes the text commands Text1 for the debugger to obtain the first address of the selected type of data structure (i.e., the pointer to the first instance). This allows an analyst to use a standard debugger with this embodiment, when the analyst already has a standard debugger available to him or her.

Clicking on button 838 called Parent Structure in FIG. 8 (fetch logic is "2") causes the GUI software 144' to display on monitor 188 a screen 1010 of FIG. 10. Screen 1010 is for specifying a parent data structure for finding a first data structure of the selected type. To specify a parent structure, the user selects in block 1014 (parameter Text1 per Table V) the template library 152 for the software 139 for which a memory dump 138 was taken. Then the user can select in block 1018 a name (parameter Text2) of a type of data structure 1022 available in the template library 152'. In block 1024, the user selects the name (parameter Text3) of the part in the template library 152' at offset Int2. In block 1032, the user specifies parameter Int3. The pointer to the first instance described in the template library 152' at offset Int3 is located in the parent structure in, for example, absolute global, system global, or procedure local, depending on block name 523 and offset 524 in the template library 152'. In block 1036, the user specifies the type of pointer (parameter Int4).

Another alternative to specifying an address with button 814 in FIG. 8, is to click on the Substructure button 842 (fetch logic value is "3"). Clicking on button 842 causes the GUI software 144' to generate screen 1110 of FIG. 11 on the monitor 188. Screen 1110 is for populating a logical table 153 of a sub data structure of a selected type of data structure. In block 1114, the user selects the proper template library name 1118 (parameter Text1 of Table VI). Next, the user selects from block 1122 the parent structure name 1126 (parameter Text2) in the selected template library 152' from which a substructure is selected. A substructure within the parent structure is defined in blocks 1130 (parameter Text 3) and 1134 (parameter Text 4). In block 1130, the user selects the starting field name 1138 of the substructure. In the end block 1134, the user selects the name of the end field 1142 of the substructure. To illustrate, the structure selected in the field 1122 can be a PCB. The starting field name 1138 could be the priority of process 230 field, and the end 1142 field could be the run time 234 field.

Figure 12:
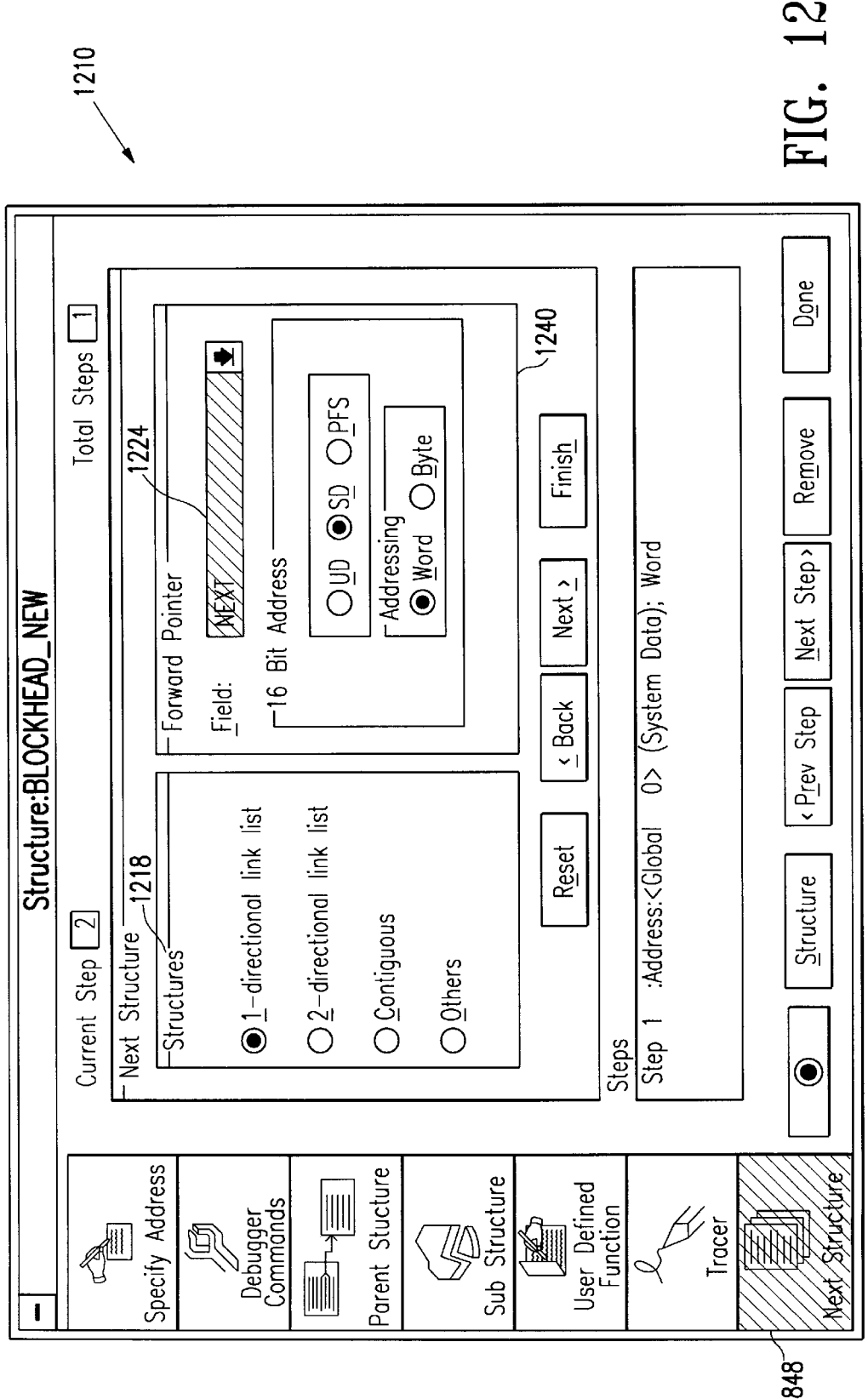
FIG. 12 shows a screen display displayed by the computer of FIG. 1 for allowing a user to select links between instances of data structures of a selected type, according to the embodiment of FIG. 1.

Returning to FIG. 4(*a*), in step 424, the GUI software 144' permits the user to enter a link between data structures of the selected type. FIG. 12 shows a screen 1210 that appears once the user clicks on the Next Structure button 848 (fetch logic is "5"). Clicking on the Next Structure button 848 is optional. To specify the link between instances of data structures, the user also can use, for example, a user defined function 834. Screen 1210 illustrates how a user can enter the link, which is stored in a row of the extraction table 151. Clicking on the Next Structure button 848 is a first sub step 616 of a second step 614, as illustrated in the extraction table of FIG. 6. In step 428, the extraction software 168' stores in the extraction table 151' the step number 614, the sub step number 616, the fetch logic 618, and the parameters 622 of Table VIII.

In screen 1210, the user has several options for supplying the type of link. The options are listed under Structures 1218 (parameter Int1). As illustrated below, the user can use screen 1210 to supply a name of a field in the selected type of data structure containing a pointer that points from one data structure to the next. Typically, all data structure of one type have the same structure. In data structures of one type, usually there is a field at the same location within all such data structures that contains a pointer to the next data structure. That pointer is supplied by the user in step 424 and stored by the GUI software 144 in the memory buffer in step 428 of FIG. 4(*a*). The user specifies the type of the pointer (parameter Int3) in block 1240.

To illustrate, in screen 1210, a first radio button 1220 (parameter Int1) for a one-directional linked list is shown as having been clicked. After button 1220 is clicked, the GUI software 144 allows the user to select from the field 1224 the name of a forward pointer in a data structure of the selected type, e.g., in a PCB. This forward pointer points to the next data structure in a linked list of data structures. A second radio button 1228 (parameter Int1) labeled 2-directional link list allows the user to select the name of forward and backward pointers in the field 1224 for possible use in a doubly linked list of data structures. Clicking on a radio button 1232 (parameter Int1) is appropriate, when the data structures are stored contiguously in memory. Contiguous storage is used when memory is allocated statically, i.e. at the beginning of running a software for which a memory dump was taken. Since this is not an exhaustive list of possible links between data structures, a fourth radio button 1236 (parameter Int1) permits the user to specify, for example, instances of data structures that are substructures of other data structures.

In step 430 of FIG. 4(*b*), as illustrated below, GUI software 144' allows the user to enter the characteristics of the last data structure of the selected type (parameter Int4). In the extraction table 151', these characteristics are stored in a second sub step of, for instance, step number "2" 614 (the first sub step being used for specifying the link). In step 434, the extraction software 168' stores these characteristics (parameter Int4) in the dedicated row of the extraction table 151'. Since this is only a sub step of step number "2" 614, the extraction software 168' does not store additional step numbers 614 in the extraction table 151', but does store an additional fetch logic value 618 and parameters 622 that describe the second sub step.

FIG. 13 illustrates a screen 1310 for specifying the last data structure. The screen 1310 gives a user a choice of specifying an end address (parameter Int4) by clicking with a mouse on radio button 1314. Screen 1310 also allows a user to specify (by clicking radio button 1318) a fixed number of instances of the selected type of data structure (parameter Int4). Furthermore, the GUI software 144' allows the user to select an end address from global memory by clicking on, for example, button 1322. Clicking on button 1322 returns the user to screen 810 of FIG. 8 (parameter Table II). Additional options for specifying an address are also available in screen 1310, as listed in the end logic block 1326 and as discussed above in the context of Tables VIII and IX.

Steps 422–434 create one row in extraction table 151'. In step 438, the GUI software 144' allows the user to specify whether the user wants to repeat steps 422–434 for another type of data structure, i.e. to create additional rows in the extraction table 151'. Next, in step 446, copies of the template library 152' and the database 150' (containing the extraction table 151') are shipped to the client 118 using the compression/decompression utility, described above. Client 118 communicates with the server 114 in step 450, to generate logical tables 153 from the memory dump 138, as further explained below. In step 450, the client 118 communicates with the server 114 to populate logical tables 153. To communicate with the server 114, the client 118 is controlled by a user through the keyboard 130, the mouse (not shown), and the monitor 126. As explained in additional detail below, in step 458, the client 118 uses the database management system 146 to operate on the logical tables 153.

Populating Logical Tables

Figure 14:
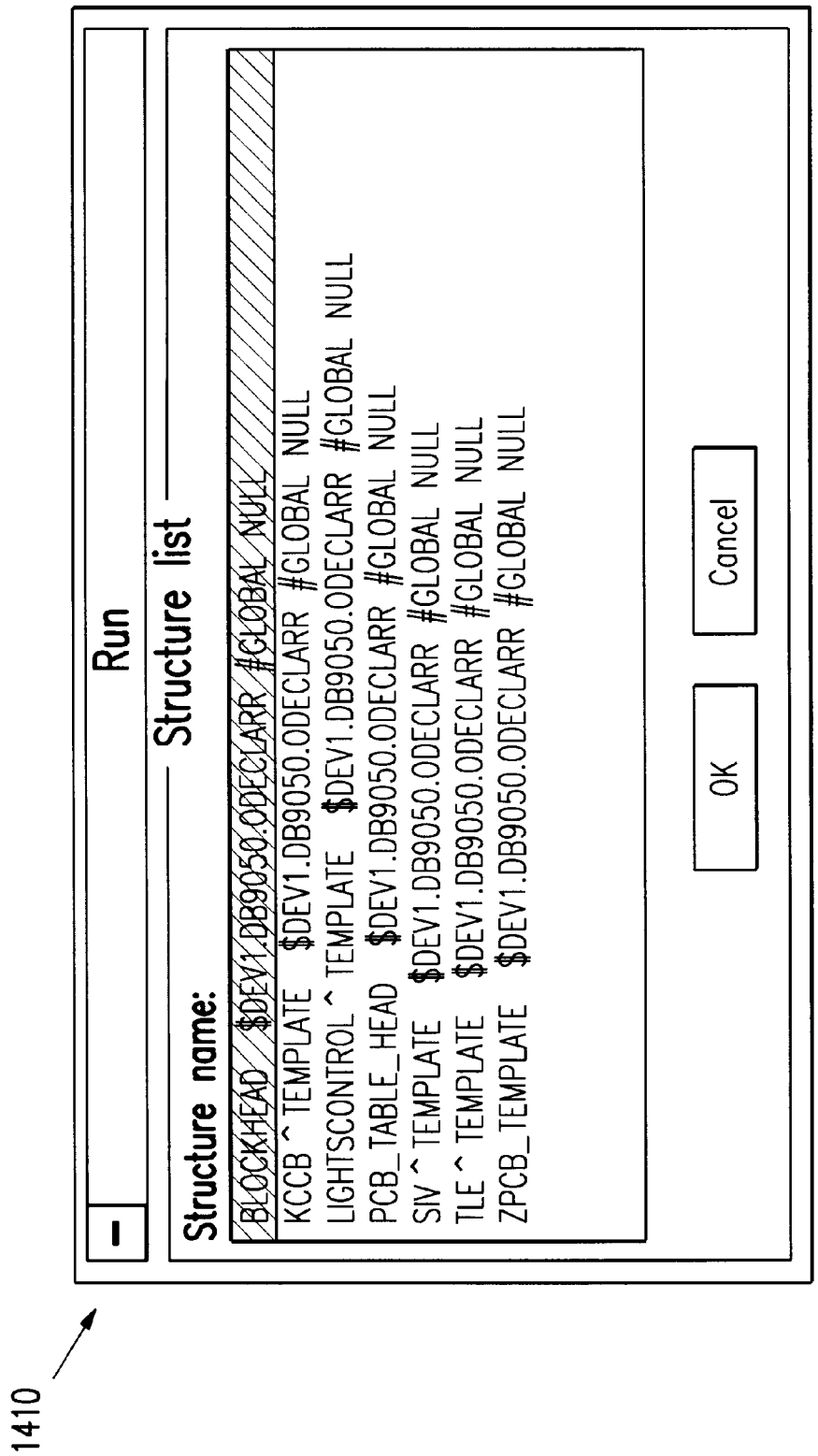
FIG. 14 is a screen display displayed by a computer of FIG. 1 for allowing a user to select a type of data structure with which to populate a logical table, according to the embodiment of FIG. 1.
Figure 15:
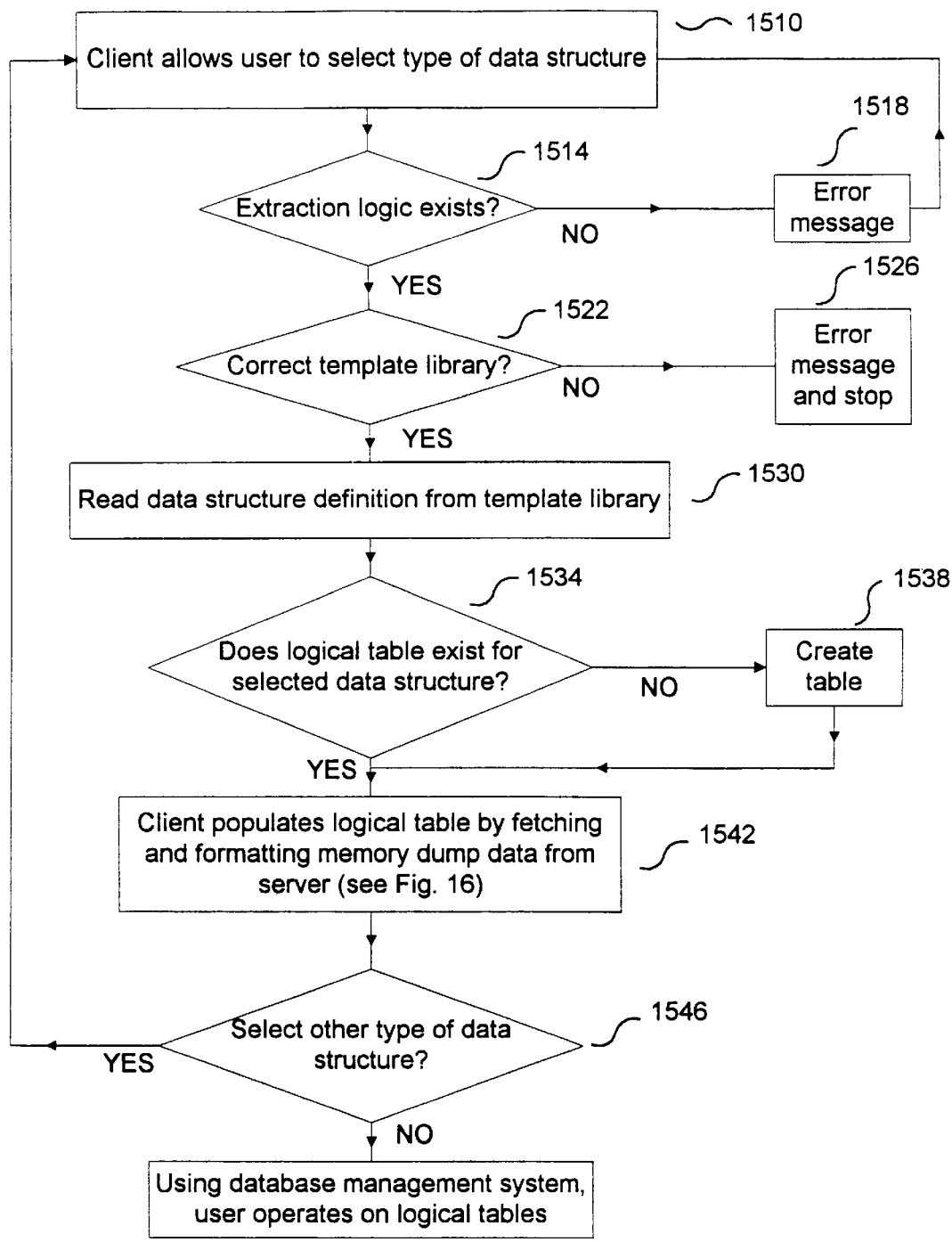
FIG. 15 is a flow chart of steps performed by a client of FIG. 1 in populating logical tables, according to the embodiment of FIG. 1.

FIG. 15 illustrates steps performed by the client 118 beginning with screen 1410 of FIG. 14 to actually populate logical tables 153. The graphical user interface 144 of the client 118 displays the screen 1410 on the monitor 126. Using screen 1410, in step 1510, the GUI software 144 permits the user to select a type of data structure with which the user wishes to populate a logical table 153. In step 1514, the client 118 verifies that the type of data structure selected has at least one row in the extraction table 151. If such a row does not exist, in step 1518, the client 118 displays an error message on the monitor 126. Following the error message, the client 118 again prompts the user for a type of data structure, in step 1510. In step 1522, having verified that the extraction logic for the selected type of data structure exists, the client 118 checks that it has available the correct template library 152. The template library 152 should be the template library 152 for the release of the software for which a memory dump 138 is taken. In step 1526, if the template library 152 is not the correct one, then an error message appears on the monitor 126 and the client 118 stops the process of preparing to populate the logical table 153.

Next, in step 1530, the client 118 reads the definition of the selected data structure from the template library 152 by using the pointers 514, 610 in the extraction table 151, which point to the data structure definitions stored in the template library 152. In step 1534, the client 118 checks whether a logical table 153 already exists for the selected type of data structure. If not, then in step 1538, the client 118 creates such a logical table 153 by connecting to the database management system 146 via Dynamic Data Exchange (DDE). DDE is a communication channel by which two processes in the operating system 154 can communicate. In step 1542, the client 118 populates a row in the logical table 153 for the selected type of data structure by fetching and formatting data from the memory dump 138, in accordance with extraction table 151. In step 1546, the user can decide to select another type of data structure with which to populate another logical table 153.

Figure 16A:
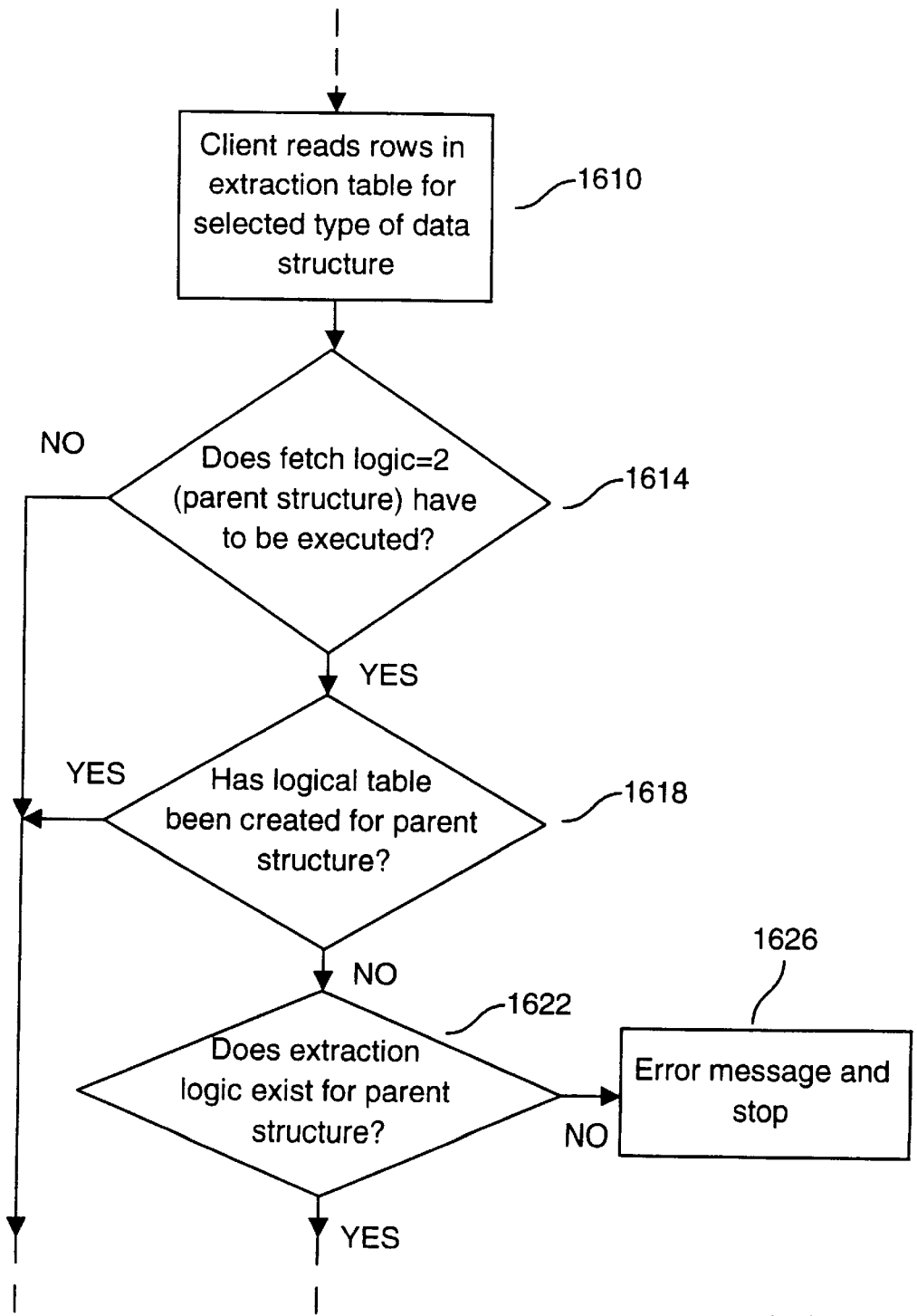
FIGS. 16(a) and 16(b) are a flow chart of additional steps performed by the client to populate logical tables, according to the embodiment of FIG. 1.
Figure 16B:
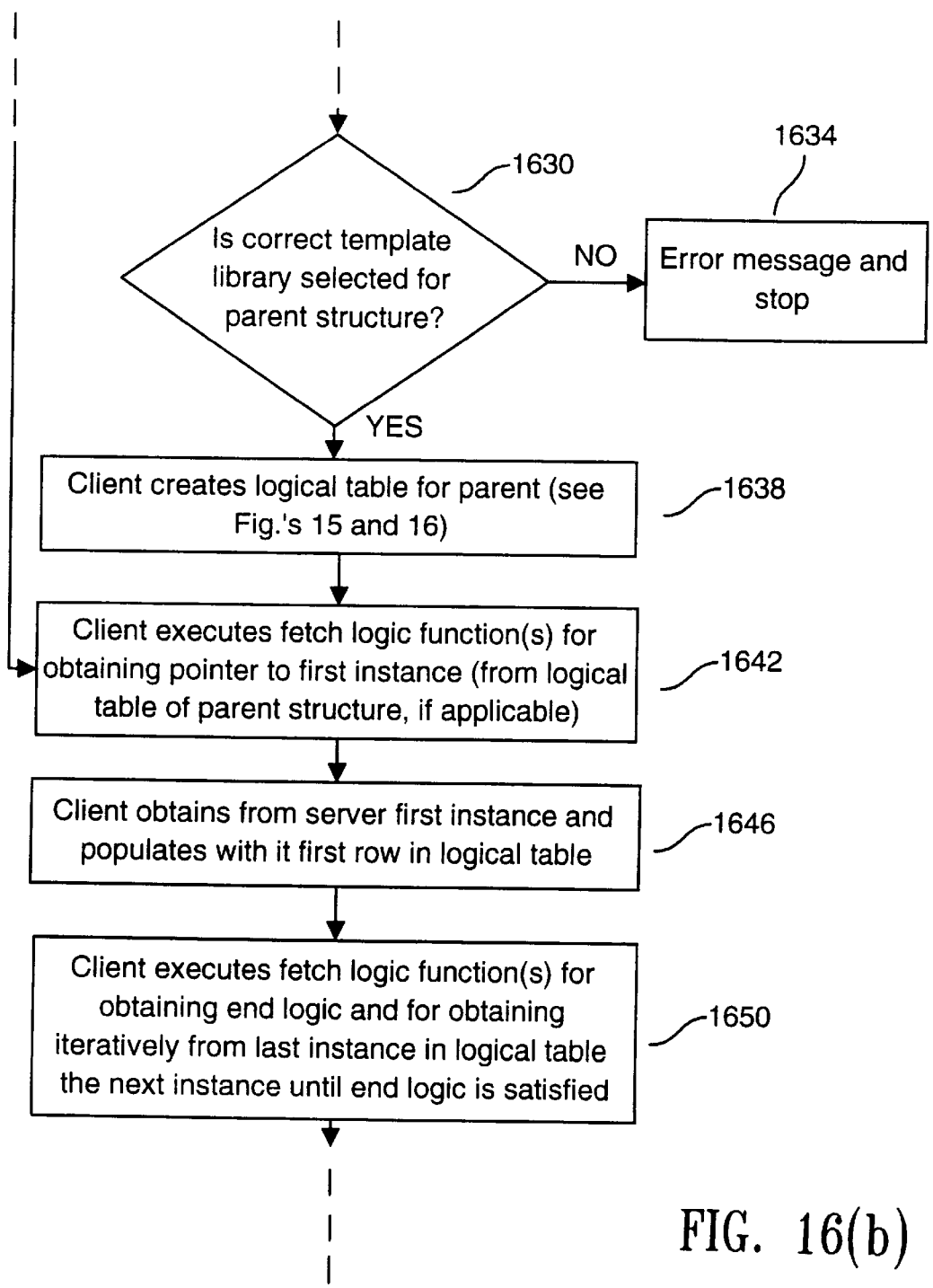

FIGS. 16(a and b) illustrate in further detail how the client 118 populates logical table 153. FIGS. 16(a and b) provide an overview of how the client 118 uses the fetch logic functions 174. In FIG. 16(a), in step 1610, to determine which fetch logic functions it needs to execute, the client 118 reads the rows in the extraction Table 151 dedicated to the user selected type of data structure. In step 1614, the client 118 determines whether a fetch logic function calls for the use of a parent structure. If a parent structure is called for, in step 1618, the client 118 checks whether a logical table has been created for the parent structure. If a logical table has not been created, in step 1622, the client 118 checks whether extraction logic exists for the parent structure in the extraction Table 151. If extraction logic is unavailable for the parent structure, in step 1626, the client 118 displays on the monitor 126 an error message and stops execution of the fetch logic function that required use of the parent structure, such as fetch logic two (parent structure) and fetch logic three (substructure).

If extraction logic exists for the parent structure, in step 1630, the client 118 verifies that the user selected the correct template library 152 for the parent structure. If not, in step 1634, the client 118 displays an error message and stops execution of the fetch logic function. If the correct template library 152 exists for the parent structure, in step 1638, the client 118 creates a logical table 153 for the parent structure in accordance with FIGS. 15 and 16. In another embodiment, there are nested parent structures that call for executing iteratively the steps illustrated in FIGS. 15 and 16.

The client 118 executes fetch logic functions in an increasing order of the step and sub step numbers 614, 616, respectively, beginning with step number "1". In step 1642, the client 118 executes the fetch logic function for obtaining a pointer to the first instance of the data structure. More than one fetch logic function may have to be executed to obtain the pointer to the first instance. For example, the fetch logic functions for a user defined function and a debugger commands may both be required. The user defined function, for instance, may use a debugger command to obtain the pointer to the first instance from the memory dump 138.

In step 1646, the client 118 sends the pointer to the first instance to the server 114. The server 114 then fetches the first instance of the user selected type of data structure and sends it to the client 118. Then, the client 118 populates the first row in a logical table 153 with the first instance of the data structure. In step 1650, the client 118 executes the fetch logic function for obtaining the end logic and the links between instances of the selected type of data structure. The client 118 obtains iteratively the next instances of the data structure up to the last one. The client 118 does so by obtaining an instance of a data structure, storing it in the logical table 153, and obtaining from the last stored instance the pointer to the next instance of the data structure. Then the client 118 repeats this process with the next instance of the data structure. The client 118 uses the communication link 122 between the client 118 and the server 114 to request data from the server 114. The user can repeat the process of FIG. 16 for each type of data structure for which the user desires to create a logical table 153.

Figure 17:
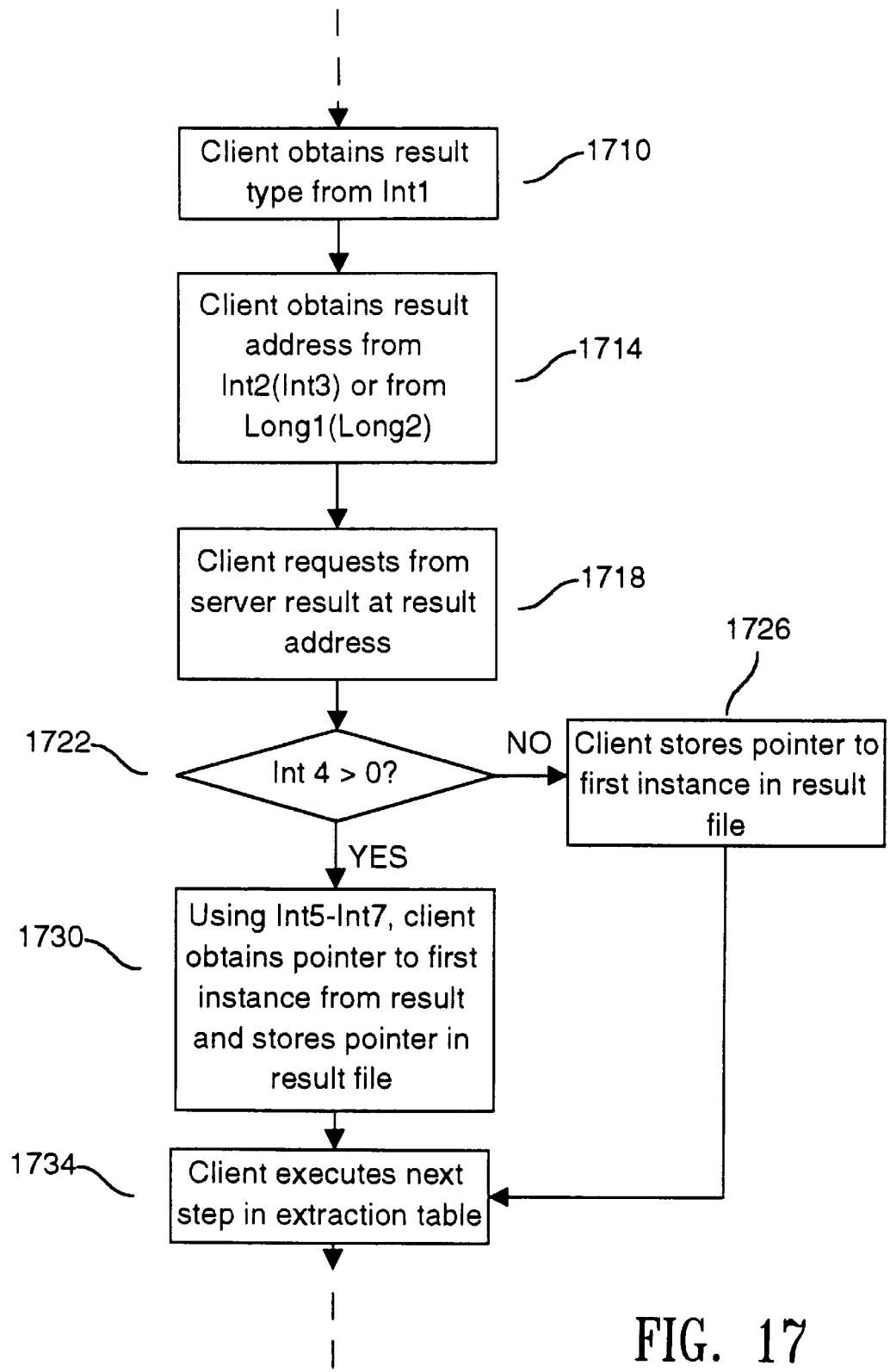
FIG. 17 is a flow chart of a fetch logic function for obtaining an address of an instance of a data structure, according to the embodiment of FIG. 1.
Figure 18:
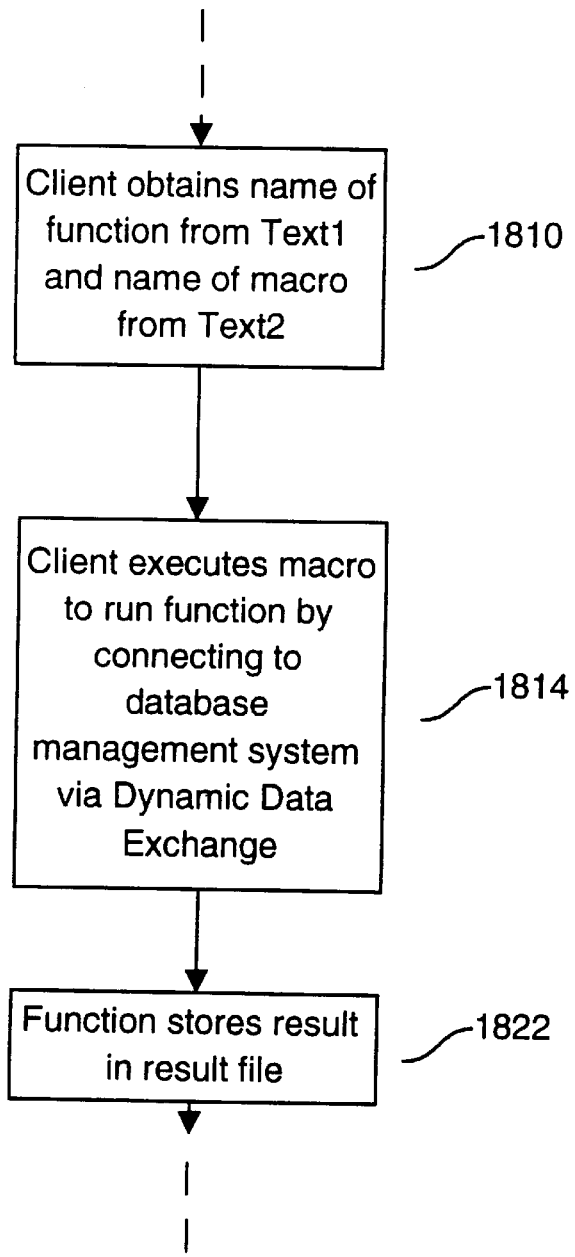
FIG. 18 is a flow chart of a fetch logic function for a user defined function, according to the embodiment of FIG. 1.
Figure 19:
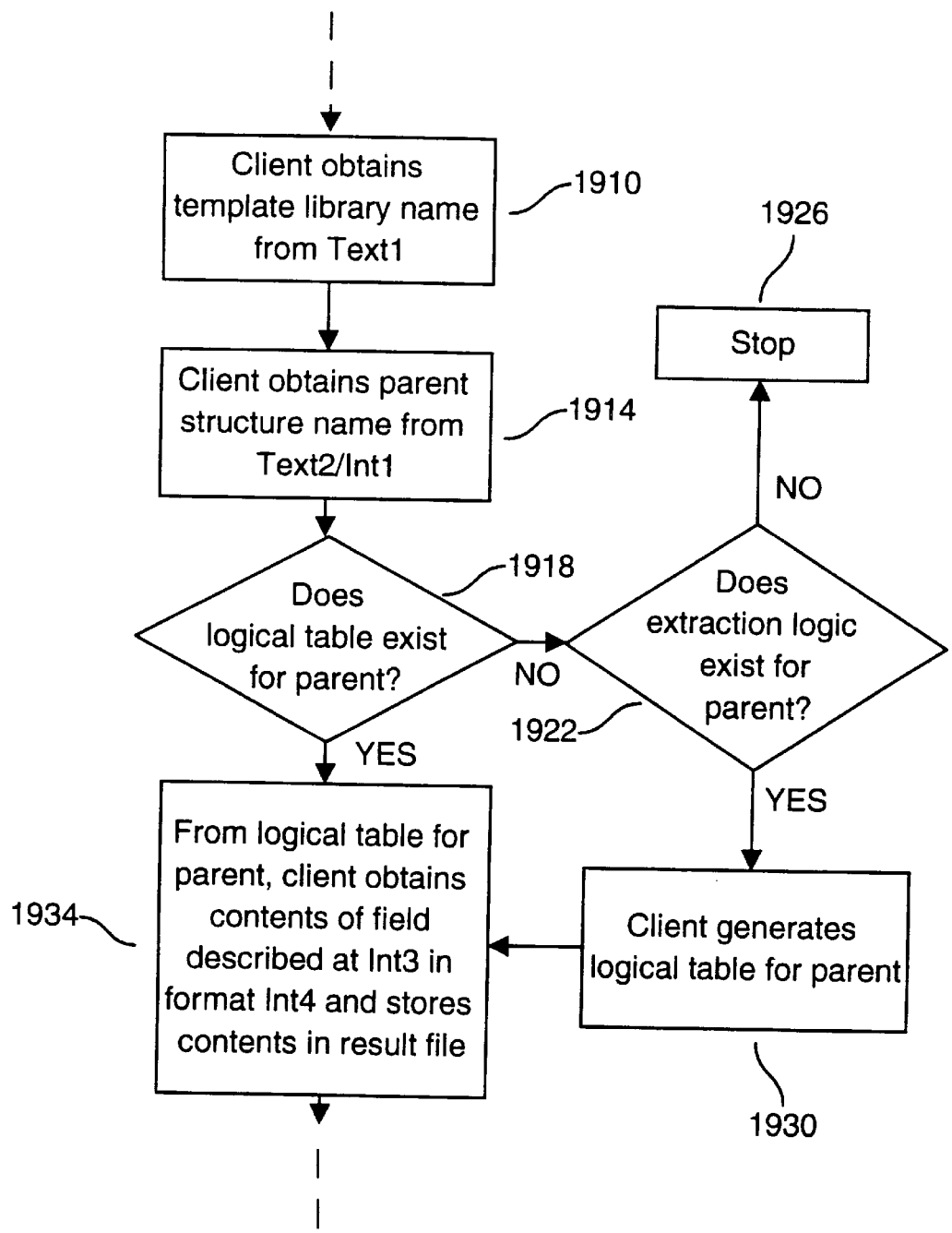
FIG. 19 is a flow chart of the fetch logic function for the use of parent structures, according to the embodiment of FIG. 1.
Figure 20:
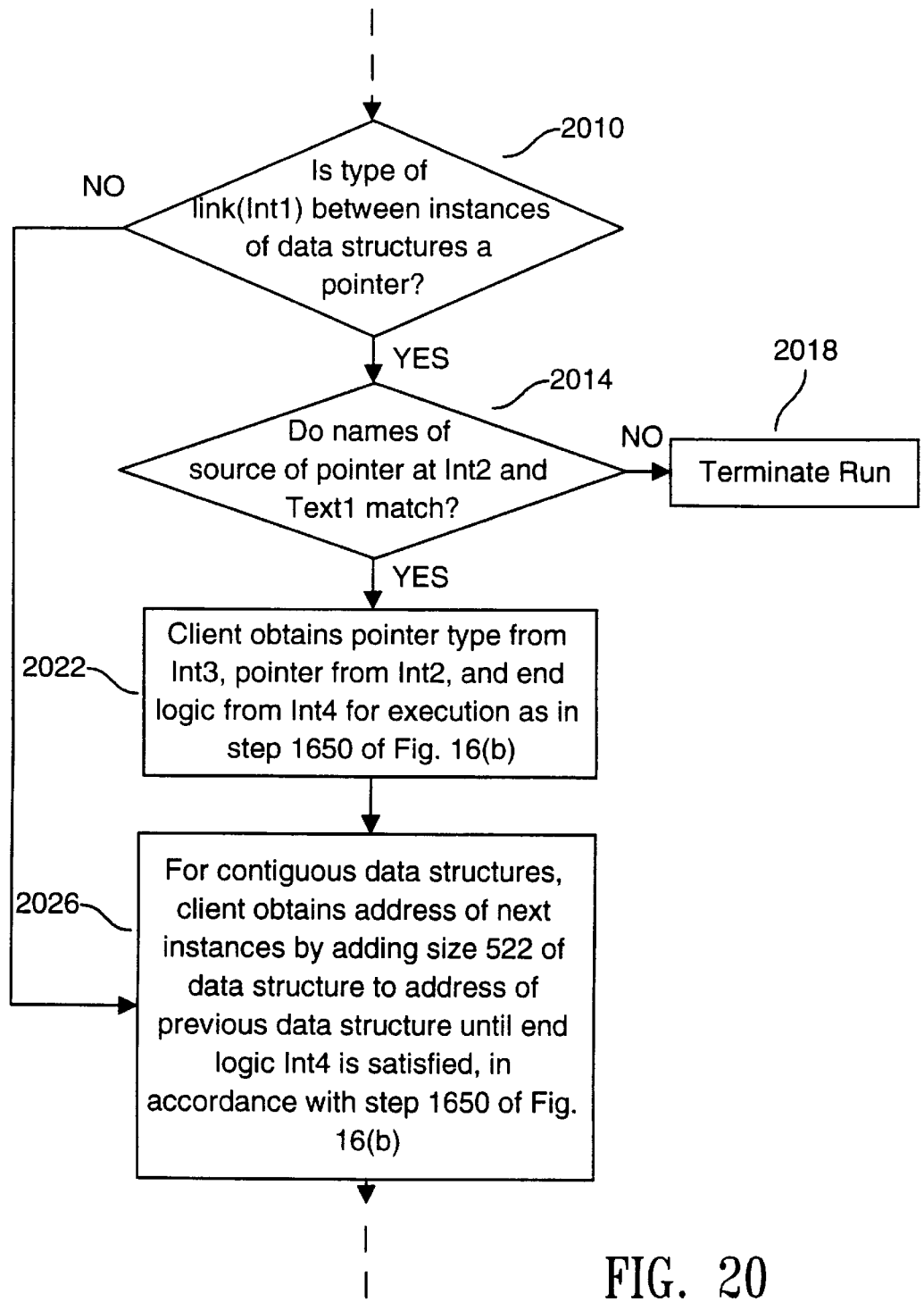
FIG. 20 is a flow chart for a fetch logic function for obtaining and using links between instances of data structures and for obtaining and using end logic, according to the embodiment of FIG. 1.

FIG. 17 illustrates details of the fetch logic function for obtaining an address of an instance of a type of a data structure. FIG. 18 illustrates the fetch logic function for a user defined function. FIG. 19 is a flow chart of the fetch logic function for the use of parent structures. FIG. 20 is a flow chart for a fetch logic function for obtaining and using links between instances of data structures and for obtaining and using the end logic. Not illustrated is a fetch logic function for obtaining and using debugger commands, because the description given above is self explanatory.

Similarly, a fetch logic function for a substructure is not shown, because it is similar to the fetch logic function for use of a parent structure.

Operating on Logical Tables

Following the creation of logical tables 153, the power of a standard database management system 146, such as MS Access, can be used to query these logical tables 153. As discussed above, the database management system 146 can be used to quickly and easily query logical tables 153 to determine for example, all PCB's with a priority of greater than one hundred. A standard database management system 146 has the ability to generate a query report. A report created by database management system 146 includes not only particular queries, but also their results. So, in this example, the report would include the query for all the PCB's of a priority greater than one hundred, and in addition it would include the actual PCB's of this priority. Many different queries (some of which were described further above) and their results can be stored in such a report. These reports are saved in the database 150, which is managed by the database management system 146.

The queries in that report can be recalled for running on logical tables 153 representative of another memory dump 138 to produce another report containing the same queries but different results of these queries. The results of the two different reports then can be compared to see if they are similar. If the results of the queries are similar, then there is a significant possibility that the problems that necessitated taking memory dumps 138 are similar, as well. Such comparisons make possible a determination of the cause of a crash without an actual understanding of the queries constructed to determine this cause. Reports for dealing with crashes can be saved in an indexed library with descriptions of the problems. A standard database management system 146 can generate an indexed library in alphabetical order of the problems.

Although, the discussion has been in terms of viewing groups of data structures, the database management system 146 can also be used to view individual instances of data structures of particular interest to a user. For instance, the user may be interested in pointers on a memory stack. When a system crashes, a memory dump 138 contains a memory stack. A memory stack contains procedure calls that make up a process. Some of the procedure calls may have been for operating on data structures. Such procedure calls include pointers to these data structures. The pointers (as well as the procedure calls) are placed on the memory stack every time a procedure call is made.

Figure 21:
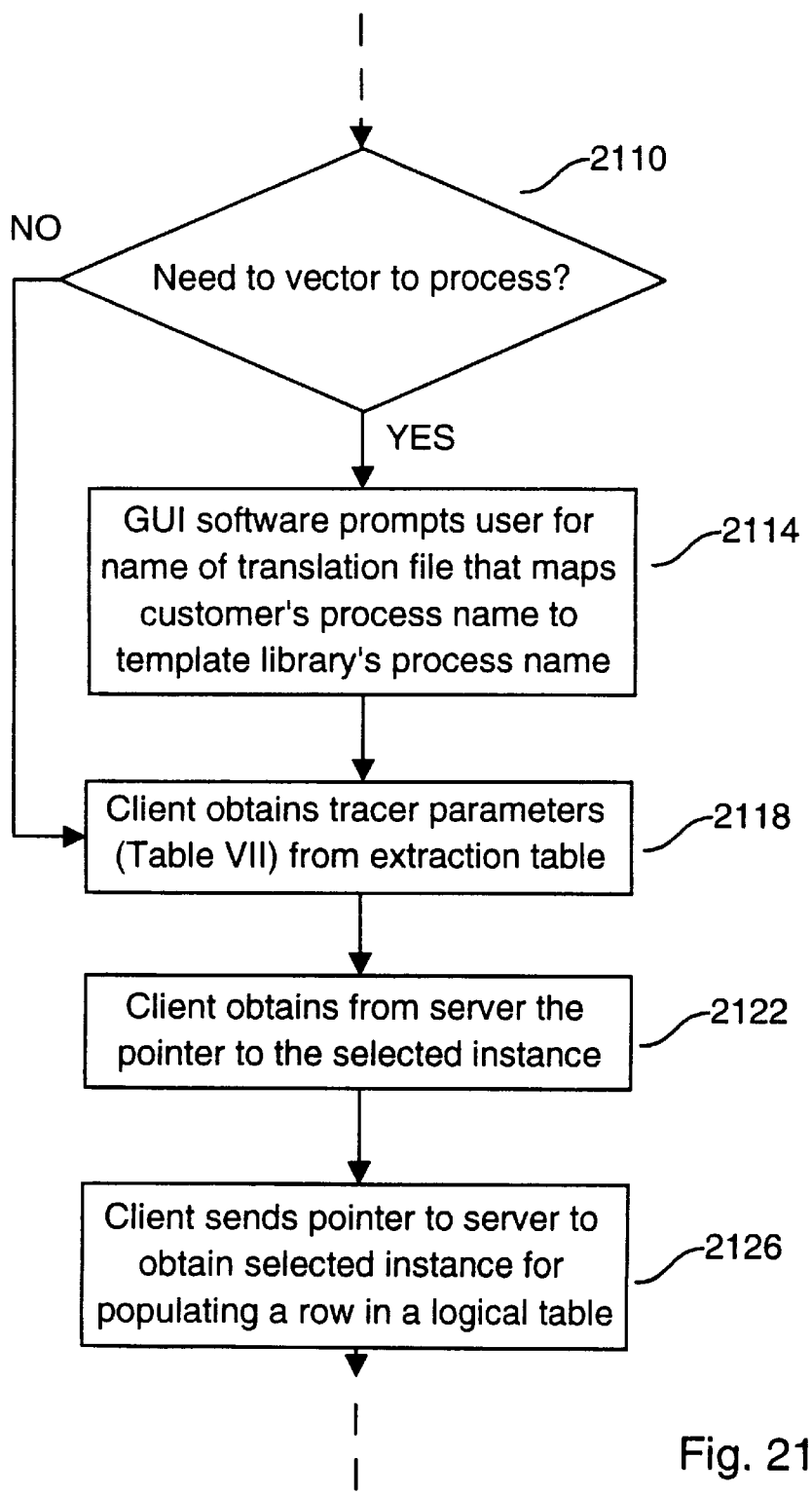
FIG. 21 is a flow chart of a fetch logic function for a tracer to pointer to an instance of a data structure, according to the embodiment of FIG. 1.

To illustrate, the user can click on Tracer button 854 in screen 810 of FIG. 8 to view pointers on the memory stack. In a screen (not shown), the GUI software 144' permits the user to enter the tracer parameters of Table VII. Of course, the tracer can be used to view any variables on the memory stack in addition to pointers. FIG. 21 illustrates the operation of the fetch logic function for a tracer. Use of the tracer 854 calls for the user to vector (if necessary; see step 2110) to the instance of a type of data structure (such as a process) of interest to the user. Vectoring to a process means that references to memory become references to that process. In step 2114, to vector to a process, the user selects in a translation file a customer assigned name to the process. The translation file maps the customer's name onto the process name, as listed in the template library 152'. The remaining steps in FIG. 21 are self-explanatory.

Several preferred embodiments of the present invention have been described. Nevertheless, it will be understood that various modifications may be made without departing from the spirit and scope of the invention. For example, instead of using three processors 114, 118, 156 with a memory each, 134, 142, 158, as shown in FIG. 1, a single processor with a single memory could be used. Also, should a user decide to generate extraction logic for a type of data structure not previously generated by the computer 156, the client 118 could use the extraction software 168 with the template library 152 to do so. Indeed, a user could install the scanner 162 in the memory 142 of the client 118 to generate an entirely new template library 152 for another software 139. Furthermore, it will be clear to one of skill in the art that the invention is not limited to data structures. For example, the above-described embodiments can be implemented using object-oriented technology. An object is a data structure that includes functions for performing operations on the data structure. An example of a data structure is a linked list. Examples of operations on the linked list are adding, deleting, and finding an element in the linked list, i.e., an instance of a data structure. An object for such a linked list includes the linked list plus functions for executing these operations. Thus, the present invention is not limited to the preferred embodiments described herein, but may be altered in a variety of ways, which will be apparent to persons skilled in the art.

What is claimed is:

1. A process for collecting a plurality of data structures into a logical table, the process, performed by a processor having a memory, comprising the steps of:

storing in the memory, a data structure definition for each of the plurality of data structures, the respective data structure definitions explicitly specifying the format of the respective data structures, including the data type and size of the data structure;

storing in the memory, an address of a first data structure that is of the type stored in the memory; and populating a logical table in the memory with the contents of the first data structure at the address in accordance with the format defined in the data structure definition of the first data structure.

2. The process as recited in claim 1, further comprising the steps of:

storing in the memory a link for linking the first data structure with a last data structure of the type contained in the memory dump;

storing in the memory an end logic of the last data structure; and populating the logical table with the contents of the last data structure in accordance with the link and the end logic.

3. The process as recited in claim 1, wherein the step of storing the data structure definition includes storing the data structure definition in a template library in the memory.

4. The process as recited in claim 1, wherein the step of storing the address includes storing the address in an extraction table in the memory.

5. The process as recited in claim 2, wherein the step of storing the link includes storing the link in an extraction table in the memory.

6. The process as recited in claim 2, wherein the step of storing the end logic includes storing the end logic in an extraction table in the memory.

7. The process as recited in claim 6, wherein the extraction table is stored in a database in the memory.

8. The process as recited in claim 2, further comprising the step of operating with a database management system on the logical table.

9. The process as recited in claim 2, further comprising the steps of:
  storing the address of the first data structure as address parameters in an extraction table in the memory;
  storing the link as link parameters in the extraction table; and
  storing the end logic as an end logic parameter in the extraction table.

10. The process as recited in claim 9, further comprising the step of:
  associating a first fetch logic function with the address parameters,
  wherein the step of populating the logical table with the contents of the contents of the first data structure includes executing the first fetch logic function in accordance with its associated parameters to fetch the contents of the first data structure from the memory dump.

11. The process as recited in claim 9, further comprising the steps of:
  associating a second fetch logic function with the link parameters;
  associating a third fetch logic function with the end logic parameter;
  wherein the step of populating the logical table with the contents of the last data structure includes executing the second and third fetch logic functions in accordance with their associated parameters to fetch the last data structure from the memory dump, such that the end logic is satisfied.

12. The process as recited in claim 1, further comprising the step of scanning provided to generate the data structure definition.

13. An apparatus for collecting into a logical table data contained in a plurality of data structures in a memory, the apparatus comprising:
  a first portion configured to store a data structure definition for each of the plurality of data structures, the respective data structure definitions explicitly specifying the format of the respective data structures, including the data type and size of the data structure;
  a second portion configured to store an address of a first data structure that is of the type; and
  a third portion configured to populate a logical table with the contents of the first data structure at the address in accordance with the format of the data structure definition of the first data structure.

14. The apparatus of claim 13, further comprising:
  a fourth portion configured to store a link for linking the first data structure with a plurality of additional data structures of the type contained in the memory dump having a last data structure, the plurality of additional data structures linked by the link; and
  a fifth portion configured to store an end logic of the last data structure;
  wherein the third portion includes a portion configured to populate the logical table with the contents of the plurality of data structures in accordance with the link and the end logic.

15. The apparatus of claim 13, wherein the first portion includes a template library for storing the data structure definition.

16. The apparatus of claim 13, wherein the second portion comprises means for storing the address in an extraction table.

17. A method performed by a client in a debug system having a memory and communicating with another computer, the method comprising the steps of:
  receiving from the other computer an extraction table having initial address logic specifying a location of an initial address of a first data structure of a type in a memory dump, and end logic specifying a last data structure of the type in the memory dump;
  obtaining the initial address of the data structure in the memory dump from the initial address location in the memory dump;
  obtaining the contents of the first data structure in the memory dump in accordance with the contents of the initial address;
  obtaining the contents of the last data structure in the memory dump in accordance with the end logic; and
  placing the contents of the first and last data structures in a logical table in memory.

18. A computer program product including a computer usable medium having computer readable code embodied therein for causing a plurality of data structures to be collected into a logical table, the computer program product comprising:
  computer readable program code devices configured to cause a computer to effect storing in a memory a data structure definition, the respective data structure definitions explicitly specifying the format of the respective data structures, including the data type and size of the data structure;
  computer readable program code devices configured to cause a computer to effect storing in the memory an address of a first data structure that is of the type stored in the memory; and
  computer readable program code devices configured to cause a computer to effect populating a logical table in the memory with the contents of the first data structure at the address in accordance with the format of the data structure definition of the first data structure.

19. The computer program product as recited in claim 18, further comprising:
  computer readable program code devices configured to cause a computer to effect storing in the memory a link for linking the first data structure with a last data structure of the type contained in the memory dump;
  computer readable program code devices configured to cause a computer to effect storing in the memory an end logic of the last data structure; and
  computer readable program code devices configured to cause a computer to effect populating the logical table with the contents of the last data structure in accordance with the link and the end logic.

20. The computer program product as recited in claim 18, wherein the computer readable program code devices configured to cause a computer to effect storing the data structure definition includes computer readable program code devices configured to cause a computer to effect storing the data structure definition in a template library in the memory.

21. The computer program product as recited in claim 18, wherein the computer readable program code device s configured to cause a computer to effect storing the address includes computer readable program code devices configured to cause a computer to effect storing the address in an extraction table in the memory.

22. The computer program product as recited in claim 19, wherein the computer readable program code devices configured to cause a computer to effect storing the link includes computer readable program code d evices configured to cause a computer to effect storing the link in an extraction table in the memory.

23. The computer program product as recited in claim 19, wherein the computer readable program code devices configured to cause a computer to effect storing the end logic includes computer readable program code devices configured to cause a computer to effect storing the end logic in an extraction table in the memory.

24. The computer program product as recited in claim 23, wherein the extraction table is stored in a database in the memory.

25. The computer program product as recited in claim 19, further comprising computer readable program code devices configured to cause a computer to effect operating with a database management system on the logical table.

26. The computer program product as recited in claim 19, further comprising:

computer readable program code devices configured to cause a computer to effect storing the address of the first data structure as address parameters in an extraction table in the memory;

computer readable program code devices configured to cause a computer to effect storing the link as link parameters in the extraction table; and computer readable program code devices configured to cause a computer to effect storing the end logic as an end logic parameter in the extraction table.

27. The computer program product as recited in claim 26, further comprising:

computer readable program code devices configured to cause a computer to effect associating a first fetch logic function with the address parameters, wherein the computer readable program code devices configured to cause a computer to effect populating the logical table with the contents of the first data structure includes computer readable program code devices configured to cause a computer to effect executing the first fetch logic function in accordance with its associated parameters to fetch the contents of the first data structure from the memory dump.

28. The computer program product as recited in claim 26, further comprising:

computer readable program code devices configured to cause a computer to effect associating a second fetch logic function with the link parameters;

computer readable program code devices configured to cause a computer to effect associating a third fetch logic function with the end logic parameter;

wherein the computer readable program code devices configured to cause a computer to effect populating the logical table with the contents of the last data structure includes computer readable program code devices configured to cause a computer to effect executing the second and third fetch logic functions in accordance with their associated parameters to fetch the last data structure from the memory dump, such that the end logic is satisfied.

* * * * *